US012574371B2

(12) United States Patent
Herder, III et al.

(10) Patent No.: US 12,574,371 B2
(45) Date of Patent: Mar. 10, 2026

(54) PRIVACY-PRESERVING BIOMETRIC AUTHENTICATION

(71) Applicant: Badge Inc., Lewes, DE (US)

(72) Inventors: Charles H. Herder, III, Dallas, TX (US); Tina P. Srivastava, Dallas, TX (US); Young Hyun Kwon, Newark, CA (US)

(73) Assignee: Badge Inc., Lewes, DE (US)

( * ) Notice: Subject to any disclaimer, the term of this patent is extended or adjusted under 35 U.S.C. 154(b) by 0 days.

(21) Appl. No.: 17/116,483

(22) Filed: Dec. 9, 2020

(65) Prior Publication Data

US 2021/0194874 A1      Jun. 24, 2021

Related U.S. Application Data

(60) Provisional application No. 63/058,330, filed on Jul. 29, 2020, provisional application No. 62/945,590, filed on Dec. 9, 2019.

(51) Int. Cl.
*H04L 9/40*        (2022.01)
*G06N 3/04*        (2023.01)
            (Continued)

(52) U.S. Cl.
CPC ........... *H04L 63/0861* (2013.01); *G06N 3/04* (2013.01); *H04L 9/0891* (2013.01);
            (Continued)

(58) Field of Classification Search
None
See application file for complete search history.

(56) References Cited

U.S. PATENT DOCUMENTS

| | | | | |
|---|---|---|---|---|
| 6,697,947 | B1 * | 2/2004 | Matyas, Jr. | ........... H04L 9/3247 713/180 |
| 7,272,245 | B1 | 9/2007 | Layton | |

(Continued)

FOREIGN PATENT DOCUMENTS

| | | |
|---|---|---|
| EP | 1 175 749 B1 | 7/2005 |
| JP | 2011-144746 A | 5/2001 |

(Continued)

OTHER PUBLICATIONS

A. F. Al Shahri, D. G. Smith and J. M. Irvine, "A secure network access protocol (SNAP), " Proceedings of the Eighth IEEE Symposium on Computers and Communications. ISCC 2003, 2003, pp. 809-814 vol.2, doi: 10.1109/ISCC.2003.1214217. (Year: 2003).*

(Continued)

*Primary Examiner* — Rupal Dharia
*Assistant Examiner* — Shadi H Kobrosli
(74) *Attorney, Agent, or Firm* — Merchant & Gould P.C.

(57)            ABSTRACT

A system for using biometric data to authenticate a subject as an individual whose biometric data has been previously obtained. A second transducer has a digital electronic signal output characterizing a biometric of the subject; a second computing facility to receive the digital electronic signal; an array of servers; and a third computing facility. These components implement processes including generating shards from the digital electronic signal and distributing of the generated shards to the array of servers; receiving and storing by the array of servers the generated shards; performing a data exchange process using a subset of the generated shards to develop information relating to authentication of the subject; and transmitting to a third computing facility, the information developed, to cause the third computing facility to generate an output value indicating
(Continued)

whether the subject is authenticated as the individual. A related enrollment system is also provided.

66 Claims, 8 Drawing Sheets

(51) Int. Cl.
H04L 9/08 (2006.01)
H04L 9/32 (2006.01)

(52) U.S. Cl.
CPC .......... H04L 9/0894 (2013.01); H04L 9/3242 (2013.01); H04L 2209/46 (2013.01)

(56) References Cited

U.S. PATENT DOCUMENTS

| | | | | |
|---|---|---|---|---|
| 11,063,941 | B2 * | 7/2021 | Teranishi | H04L 63/0876 |
| 11,223,478 | B2 * | 1/2022 | Eldefrawy | H04L 9/0861 |
| 11,329,980 | B2 * | 5/2022 | Callahan | H04L 63/0823 |
| 12,206,783 | B2 * | 1/2025 | Streit | H04L 9/3226 |
| 2001/0031075 | A1 | 10/2001 | Fujii | |
| 2006/0123239 | A1 | 6/2006 | Martinian et al. | |
| 2007/0118758 | A1 | 5/2007 | Takahashi et al. | |
| 2007/0140145 | A1 | 6/2007 | Kumar et al. | |
| 2008/0025575 | A1 | 1/2008 | Schonberg et al. | |
| 2008/0072068 | A1 | 3/2008 | Wang et al. | |
| 2008/0235515 | A1 | 9/2008 | Yedidia et al. | |
| 2009/0271634 | A1 | 10/2009 | Boult et al. | |
| 2011/0126024 | A1 | 5/2011 | Beatson et al. | |
| 2011/0302420 | A1 | 12/2011 | Davida | |
| 2012/0087550 | A1 | 4/2012 | Akkermans et al. | |
| 2012/0195475 | A1 | 8/2012 | Abiko | |
| 2014/0105403 | A1 | 4/2014 | Baldi et al. | |
| 2014/0139318 | A1 | 5/2014 | Malpani et al. | |
| 2014/0372766 | A1 | 12/2014 | Ryan, Jr. | |
| 2015/0347781 | A1 * | 12/2015 | Patey | G06F 21/6245 |
| | | | | 726/30 |
| 2016/0034585 | A1 | 2/2016 | Rokhlenko et al. | |
| 2016/0125416 | A1 | 5/2016 | Spencer et al. | |
| 2017/0085562 | A1 | 3/2017 | Schultz et al. | |
| 2017/0141920 | A1 | 5/2017 | Herder, III et al. | |
| 2017/0243225 | A1 * | 8/2017 | Kohli | G06Q 20/40145 |
| 2017/0337364 | A1 | 11/2017 | Whaley et al. | |
| 2018/0114226 | A1 | 4/2018 | Desai et al. | |
| 2018/0365119 | A1 | 12/2018 | Lazier et al. | |
| 2019/0116180 | A1 | 4/2019 | Teranishi et al. | |
| 2019/0311100 | A1 * | 10/2019 | Lindell | G06F 21/32 |
| 2019/0311148 | A1 * | 10/2019 | Andrade | G06F 16/84 |
| 2019/0312731 | A1 * | 10/2019 | Eldefrawy | H04L 9/085 |
| 2019/0372760 | A1 * | 12/2019 | Zheng | H04L 9/085 |
| 2020/0153627 | A1 * | 5/2020 | Wentz | G06F 21/6218 |
| 2020/0186528 | A1 * | 6/2020 | Fan | G06F 17/16 |
| 2020/0228340 | A1 * | 7/2020 | Blackhurst | H04L 9/3231 |
| 2020/0259638 | A1 * | 8/2020 | Carmignani | H04L 9/50 |
| 2020/0267144 | A1 * | 8/2020 | Wagner | G06Q 20/1085 |
| 2020/0293643 | A1 * | 9/2020 | Wang | G06F 21/6218 |
| 2021/0014063 | A1 * | 1/2021 | Arora | H04L 9/321 |
| 2021/0044429 | A1 * | 2/2021 | Yang | H04L 9/14 |
| 2021/0141896 | A1 * | 5/2021 | Streit | G06V 40/16 |
| 2021/0194874 | A1 * | 6/2021 | Herder, III | H04L 9/3231 |
| 2021/0336792 | A1 * | 10/2021 | Agrawal | H04L 9/30 |
| 2022/0261466 | A1 * | 8/2022 | Gelardi | H04L 63/0861 |

FOREIGN PATENT DOCUMENTS

| | | |
|---|---|---|
| JP | 2006-166433 A | 6/2006 |
| JP | 2007-148470 A | 6/2007 |
| JP | 2008-502071 A | 1/2008 |
| KR | 10-2018-0000849 A | 1/2018 |
| KR | 101845192 B1 | 4/2018 |
| WO | 2005/069534 | 7/2005 |
| WO | 2005/122467 A1 | 12/2005 |
| WO | WO 2014/108835 A2 | 7/2014 |
| WO | 2017/075063 A1 | 5/2017 |
| WO | 2017/195886 A1 | 11/2017 |
| WO | WO-2018222211 A1 * | 12/2018 | ............. G06F 21/32 |

OTHER PUBLICATIONS

International Searching Authority/EP, International Search Report and Written Opinion of the International Searching Authority, Application No. PCT/US2020/063968, mailed March 5, 2021, 17 pages.

A.F. Al Shahri et al., *A Secure Network Access Protocol (SNAP)*, Computers and Communication, 2003. (ISCC 2003). Proceedings. Eighth IEEE International Symposium on Jun. 30-Jul. 3, 2003, Piscataway, NJ, USA, IEEE, US, Jan. 1, 2003), pp. 809-804.

Herder et al., "Trapdoor Computational Fuzzy Extractors and Stateless Cryptographically-Secure Physical Unclonable Functions," IEEE Transactions on Dependable and Secure Computing, vol. PP, No. 99, 18 pages (Mar. 1, 2016).

Herder et al., "A Stateless Cryptographically-Secure Physical Unclonable Function," IEEE Transactions on Dependable and Secure Computing, 17 pages, (2015).

Rivest et al., "A Method for Obtaining Digital Signatures and Public-Key Cryptosystems," Communications of the ACM, vol. 21, No. 2, pp. 120-126, (Feb. 1978).

Herder et al., "Trapdoor Computational Fuzzy Extractors," International Association for Cryptologic Research, vol. 20141118:190315, Nov. 15, 2014, 14 pages.

Fuller et al., "Computational Fuzzy Extractors," International Conference on Computer Analysis of Images and Patterns, Springer, Berlin, Heidelberg, Dec. 1, 2013, pp. 174-193.

Nandakumar et al., "Fingerprint-Based Fuzzy Vault: Implementation and Performance," IEEE Transactions on Information Forensics and Security, vol. 2, No. 4, Dec. 2007, pp. 744-757.

International Searching Authority, International Search Report —International Application No. PCT/US2016/061647, dated Feb. 21, 2017, together with the Written Opinion of the International Searching Authority, 14 pages.

U.S. Patent and Trademark Office/Lin Chang, Non-Final Rejection, U.S. Appl. No. 15/349,781, dated Jul. 23, 2018, 25 pages.

U.S. Patent and Trademark Office/Lin Chang, Final Rejection, U.S. Appl. No. 15/349,781, dated Feb. 14, 2019, 29 pages.

U.S. Patent and Trademark Office/Lin Chang, Non-Final Rejection, U.S. Appl. No. 15/349,7481, dated Jun. 12, 2019, 25 pages.

European Patent Office, Extended European Search Report, Application No. 168651412, dated Jun. 21, 2019, 5 pages.

International Searching Authority/KR, International Search Report and Written Opinion of the International Searching Authority, Application No. PCT/USZO19/032996, mailed Sep. 24, 2019, 13 pages.

Dodis et al., *Fuzzy Extractors: How to Generate Strong keys from Biometrics and Other Noisy Data*, Apr. 17, 2004, Advances in Cryptology—Eurocrypt 2004, LNCS, Springer, pp. 523-540, 978-3-540- 21935-4, XP019005038.

European Patent Office, Communication pursuant to Article 94(3) EPC, Application No. 168651412, dated Febr. 7, 2020, 6 pages.

International Searching Authority/European Patent Office, International Search Report and Written Opinion of the International Searching Authority, Application No. PCT/U82020/015607, mailed Apr. 17, 2020, 15 pages.

Wang, Yi (Alice) et al., "Global Ridge Orientation Modeling for Partial Fingertip Identification", IEEE Transactions on Pattern Analysis and Machine Intelligence, vol. 33, No. 1, Jan. 2011 (16 pages).

* cited by examiner

Download the doubly encrypted shards and the shards of k
31

Reconstruct k
32

Decrypt one layer of the shards
33

Select a subset of the encrypted shards
34

Send the subset to server a for decrypting the encoded $u^d$ and evaluating a match
35

PRIVACY-PRESERVING BIOMETRIC AUTHENTICATION

RELATED APPLICATION

This patent application claims the benefit of U.S. provisional patent application Ser. No. 63/058,330, filed Jul. 29, 2020, and U.S. provisional patent application Ser. No. 62/945,590, filed Dec. 9, 2019. Each of these applications is hereby incorporated herein by reference in its entirety.

TECHNICAL FIELD

The present invention relates to biometric authentication, and more particularly to privacy-preserving biometric authentication.

BACKGROUND ART

Biometric-based authentication provides a powerful function in today's digital world: It allows people to authenticate themselves securely using biometrics without having to remember a complex password or carry around a hardware token. During enrollment or registration, an individual's biometric is captured, and the biometric or biometric template is stored. (A biometric template can be created from biometric data, for example by using algorithms involving feature extraction or using machine learning or computer vision algorithms.) Then, during a subsequent authentication, a subject's biometric is captured and compared with or matched against the stored biometric or biometric template. This approach, however, comes with problematic security and privacy issues. For example, in traditional biometric matching, the system must be able to access the template in plain-text in order to run the matching algorithm—this opens a vulnerability for attackers to steal the template or breach a database to obtain users' biometric data or other confidential information, similar to how attackers breach password databases. The damages are worse with biometrics, as the users cannot reset them. Fingerprints cannot be reset like passwords. The biometrics are either stored centrally or locally. When the biometrics are stored in one or more centralized databases, the databases are a honey pot for hackers to target. When the biometrics are stored locally, such as in each user's device like an iPhone, there are additional drawbacks including, for example, that if a user loses her device, she can no longer authenticate because the biometric she enrolled with was stored on her lost device—so there is no stored biometric available to match against.

Today's "multiparty computation" or "MPC" techniques, when applied to biometrics, still require the biometric template from enrollment to be stored on a server. During authentication, the subject's biometric template on a client is compared with the biometric template on the server using multiparty computation, wherein the server and client perform MPC to compute a match score of the two templates. Although this technique avoids the parties' exchanging biometric templates (as occurs in classical biometric authentication), the approach is not privacy preserving, for example because both the server and client learn this match score. Existing approaches that use MPC are too inefficient to scale to millions of users. For example, certain approaches require excessive computation (such as on the order of seconds per user per authentication), while others require excessive communication (sometimes >10 MB exchanged per user per authentication over dozens or even hundreds of rounds), while others have a weak security model (such as insecure with one or more actively malicious servers). Many such approaches require the server to store the biometric template in plaintext, just as in traditional biometric authentication. One approach shards the data between the client and server, which prevents a single point of failure at the server, but this introduces a requirement to have the same client device be used in future authentication, because the shard or shards stored by the client device are required in future authentication. Therefore, this approach shares the limitations of locally stored biometric authentication, because loss of the client device implies loss of the credential and ability to authenticate.

SUMMARY OF THE EMBODIMENTS

The present application describes a privacy-preserving approach to authenticate users with significant improvements over the prior art.

In accordance with one embodiment of the invention, there is provided a method for using biometric data to authenticate a subject as an individual whose biometric data has been previously obtained using a first transducer. The method utilizes computer processes that include generating shards from a digital electronic signal, provided as an output by a second transducer, such signal characterizing a biometric of the subject. The computer processes also include causing distribution of the generated shards to an array of servers, so that the array of servers can store the generated shards and perform a data exchange process using a subset of the generated shards to develop information relating to authentication of the subject. The computer processes further include processing the information developed by the array of servers to generate an output value indicating whether the subject is authenticated as the individual.

Optionally, the computer processes are performed by computing entities configured as information-sharing restricted with respect to a set of items of information selected from the group consisting of the output value, the digital electronic signal, the individual's biometric data, the subject's biometric, the generated shards, and combinations thereof. Optionally, the computer processes further include encoding the digital electronic signal, so that the generated shards are also encoded. Alternatively or additionally, encoding includes using a neural net. Alternatively or additionally, encoding includes representing the digital electronic signal as a set of vectors in a metric space. Alternatively or additionally, performing the data exchange process, using the subset of the generated shards to develop information relating to authentication of the subject, includes computing a set of distances in the metric space.

Optionally, the data exchange process includes a multiparty computation under conditions wherein none of the servers in the server array obtains intermediate values of the multiparty computation. Optionally, a selected group of the array of servers causes generation of new shards based on the generated shards. Optionally, a shard is revocable by a revocation process that includes the data exchange process. Alternatively or additionally, upon revocation of the shard, generation of a new shard does not require the individual re-engage with the first transducer. Alternatively or additionally, the revocation process is configured in a manner without communication between the array of servers and other computing entities. Alternatively or additionally, the revocation process includes performing the data exchange process using a subset of the subset of generated shards from a subset of the array of servers. Alternatively or additionally, the data exchange process involves communication among a selected group of servers from the array of servers. Alternatively or additionally, performing the data exchange process includes separately processing, by each server, its generated shards of the individual along with its generated shards of the subject to generate a new set of shards, the new set of shards constituting the output value. Alternatively or additionally, the data exchange process includes causing the array of servers to execute a multiparty computation algorithm to determine a blinded value, causing the array of servers to compute a corresponding shard, and to return, to a computing entity, the computed shard along with values for the message authentication codes previously computed, causing the computing entity to use the shard data to determine whether the subject is authenticated as the individual and to evaluate the message authentication codes.

Optionally, receiving and storing by the array of servers the generated shards includes receiving and storing message authentication codes for the shards and the data exchange process includes using the message authentication codes to confirm that the output value indicating whether the subject is authenticated as the individual is itself authentic. Optionally, receiving and storing by the array of servers the generated shards includes receiving and storing shards of Beaver triples distributed across the array of servers with the generated shards. Alternatively or additionally, receiving and storing by the array of servers the generated shards includes receiving and storing message authentication codes for the Beaver triples. Alternatively or additionally, receiving and storing by the array of servers the generated shards includes receiving and storing shards of a corresponding message authentication code key.

Optionally, receiving and storing by the array of servers the generated shards includes receiving and storing shards of a random value. Optionally, receiving and storing by the array of servers the generated shards includes receiving and storing shards of a function that contributes to an authentication process. Optionally, receiving and storing by the array of servers the generated shards includes extracting a confident subset of a set of biometric values of the subject in the digital electronic signal. Optionally, receiving and storing by the array of servers a set of values to enable efficient subsequent generation of shards includes receiving and storing items selected from the group consisting of Beaver triples, authentication shares, message authentication code shards, random shards, other shards, and combinations thereof.

In accordance with another embodiment of the invention, there is provided a system for using biometric data to authenticate a subject as an individual whose biometric data has been previously obtained using a first transducer coupled to a first computing facility. The system having computing components that include a second transducer having a digital electronic signal output that characterizes a biometric of the subject. The computing components also include a second computing facility, coupled to the second transducer, configured to receive from the second transducer the digital electronic signal. The computing components further include an array of servers and a third computing facility. The second computing facility, the array of servers, the third computing facility, and a computer-readable medium encoded with instructions, which upon execution by the foregoing computing components, establish computer processes that include causing, by the second computing facility, generating of shards from the digital electronic signal and distributing of the generated shards to the array of servers. The computer processes also include receiving and storing by the array of servers the generated shards. The computer processes further include performing, by a subset of the array of servers, a data exchange process using a subset of the generated shards to develop information relating to authentication of the subject. The computer processes also include transmitting, by the subset of the array of servers, to a third computing facility, the information developed, wherein the developed information is configured to cause the third computing facility to generate an output value indicating whether the subject is authenticated as the individual.

Optionally, the computer processes are performed under conditions wherein the computing components are configured as information-sharing restricted with respect to an item of information selected from the group consisting of the output value, the digital electronic signal, the individual's biometric data, the subject's biometric, and the generated shards. Optionally, the computer processes are performed under conditions wherein the computing components are configured as information-sharing restricted with respect to a plurality of items of information selected from the group consisting of the output value, the digital electronic signal, the individual's biometric data, the subject's biometric, and the generated shards.

Optionally, causing by the second computing facility further includes causing encoding of the digital electronic signal, so that the generated shards are also encoded. Alternatively or additionally, causing encoding includes causing use of a neural net to achieve encoding. Alternatively or additionally, causing encoding includes causing representation of the digital electronic signal as a set of vectors in a metric space. Alternatively or additionally, performing the data exchange process, using the subset of the generated shards to develop information relating to authentication of the subject, includes computing a set of distances in the metric space. Optionally, the data exchange process includes a multiparty computation wherein none of the servers in the server array obtains intermediate values of the multiparty computation. Optionally, a selected group of the array of servers causes generation of new shards based on the generated shards.

Optionally, a shard is revocable by a revocation process that includes the data exchange process. Alternatively or additionally, upon revocation of the shard, generation of a new shard does not require the individual re-engage with the first transducer. Alternatively or additionally, the revocation process does not require communication between the computing facility and the array of servers. Alternatively or additionally, the revocation process includes performing the data exchange process using a subset of the subset of generated shards from a subset of the subset of the array of servers. Alternatively or additionally, the data exchange process involves communication among a selected group of servers from the array of servers. Alternatively or additionally, performing the data exchange process includes separately processing, by each server, its generated shards of the individual along with its generated shards of the subject to generate a new set of shards, the new set of shards constituting the output value.

Optionally, receiving and storing by the array of servers the generated shards includes receiving and storing message authentication codes for the shards and the data exchange process includes using the message authentication codes to confirm that the output value indicating whether the subject is authenticated as the individual is itself authentic. Alternatively or additionally, receiving and storing by the array of servers the generated shards includes receiving and storing shards of Beaver triples distributed across the array of servers with the generated shards. Alternatively or additionally, receiving and storing by the array of servers the generated shards includes receiving and storing message authentication codes for the Beaver triples. Alternatively or additionally, receiving and storing by the array of servers the generated shards includes receiving and storing shards of a corresponding message authentication code key.

Optionally, receiving and storing by the array of servers the generated shards includes receiving and storing shards of a random value. Optionally, receiving and storing by the array of servers the generated shards includes receiving and storing shards of a function that contributes to an authentication process. Alternatively or additionally, receiving and storing by the array of servers the generated shards includes extracting a confident subset of a set of biometric values of the subject in the digital electronic signal. Alternatively or additionally, the data exchange process includes causing the array of servers to execute a multiparty computation algorithm to determine a blinded value, causing the array of servers to compute a corresponding shard, and to return, to the second computing facility, the computed shard along with values for the message authentication codes previously computed, causing the second computing facility to use the shard data to determine whether the subject is authenticated as the individual and to evaluate the message authentication codes. Alternatively or additionally, receiving and storing by the array of servers a set of values to enable efficient subsequent generation of shards includes receiving and storing items selected from the group consisting of Beaver triples, authentication shares, message authentication code shards, random shards, other shards, and combinations thereof.

In accordance with one embodiment of the invention, there is provided a system for securely enrolling biometric data of an individual for purposes of later authentication of a subject as the individual. The system has components that include a first transducer having a digital electronic signal output that characterizes a biometric of the individual. The components also include a first computing facility, coupled to the first transducer, configured to receive from the first transducer, the digital electronic signal. The components further include an array of servers and a second computing facility. The first computing facility, the array of servers, the second computing facility and a computer-readable medium encoded with instructions, which upon execution by the foregoing computing components, establish computer processes that include causing generating of original shards from the digital electronic signal. The computer processes further include distributing, across the array of servers, the generated original shards. The computer processes also include causing the array of servers to store the generated original shards. The generated original shards being stored under conditions wherein the generated original shards are revocable.

Optionally, the first computing facility, the array of servers, and the second computing facility are configured to implement computer processes further includes causing generating of new shards based on the original shards. Alternatively or additionally, generating new shards does not require communication between the first computing facility and the array of servers. Optionally, in the computer processes implemented by the first computing facility, the array of servers, and the second computing facility, distributing, across the array of servers, the generated original shards further includes distributing the generated original shards across the array of servers along with helper information selected from the group consisting of Beaver triples, function secret shares, and combinations thereof, such helper information being available for use in later authentication of the subject; and causing the array of servers to store the helper information in association with the generated original shards.

In accordance with one embodiment of the invention, there is provided a system for securely enrolling biometric data of an individual for purposes of later authentication of a subject as the individual, the system having computing components that include a first transducer having a digital electronic signal output that characterizes a biometric of the individual. The computing components also include a first computing facility, coupled to the first transducer, configured to receive from the first transducer, the digital electronic signal. The computing components further include an array of servers and a second computing facility. The first computing facility, the array of servers, the second computing facility, and a computer-readable medium encoded with instructions, which upon execution by the foregoing computing components, establish computer processes that include causing generating of original shards from the digital electronic signal. The computer processes also include distributing, across the array of servers, the generated original shards. The computer processes further include causing the array of servers to store the generated original shards. The computer processes also include causing generating of new shards based on the original shards.

Optionally, generating new shards does not require communication between the first computing facility and the array of servers.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1A:
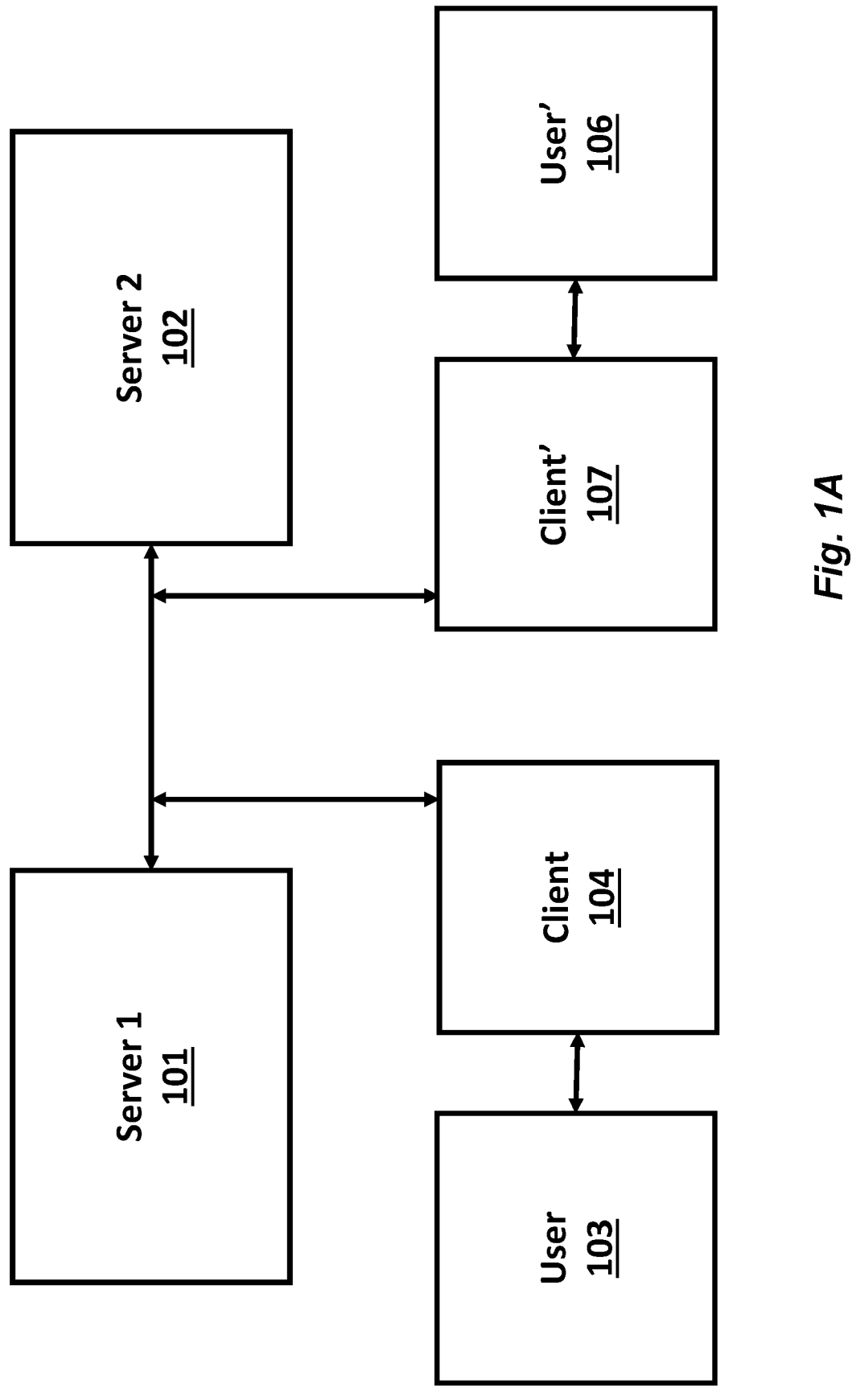
FIG. 1A is a block diagram of a computer system for performing enrollment and authentication in accordance with an embodiment of the present invention.

Definitions. As used in this description and the accompanying claims, the following terms shall have the meanings indicated, unless the context otherwise requires:

A "set" includes at least one member.

A "subset" includes a set of the entirety.

An "array of servers" is a plurality of servers.

A system of computing components is configured as "information-sharing restricted" with respect to an item of information when the item of information is being handled by a given component and the given component is prevented from sharing the information with at least one other component of the system. For purposes of this definition, an array of servers is considered a single component.

A "computer process" is the performance of a described function in a computer system using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

An "individual" is an animate or inanimate object having a unique identity, and may be a human or other organism.

A "subject" is an animate or inanimate object purporting to have the unique identity of a specific individual.

A "biometric" is a measurable characteristic of a distinct individual or of a distinct group of individuals, or a combination of such characteristics, that may be used to determine the unique identity of the individual or group. Some non-limiting examples of such measurable organic characteristics are: an iris pattern, a periocular region of a face, a retinal blood vessel pattern, a fingerprint, a genetic pattern or DNA fingerprint, a voice print, a speed or cadence of typing, a pattern of blood flow, a brain structure or electrical pattern, a behavioral signal (such as hand movements), expertise-based continuous biometrics, and a gait of the individual. An example of a measurable inorganic characteristic, when the individual is a distinct silicon wafer having transistors, is a random variation in the transistor gate delays caused by the process of manufacturing the distinct silicon wafer; such a "silicon biometric" is detectable using a ring oscillator, as is known in the art.

A "biometric value" is a categorization of a portion of a measurement of a biometric according to a property of the measurement. For example, if the biometric is an iris print, and measurement consists of imaging an iris as an array of pixels, then the relevant portion of the measurement is a single pixel in the image, and the relevant property may be a brightness or color of the pixel to be categorized. Measurement of the entire biometric may include many biometric values.

A "confidence value for a biometric value", or simply "confidence value", is a number indicating a degree of relative confidence that the corresponding biometric value was correctly categorized.

A "confident subset" of biometric data is a collection of biometric values, selected according to their respective confidence values, that is (a) large enough to uniquely identify an individual within a given universe of identifiable individuals, and (b) small enough to be repeatably obtainable across measurements of the corresponding biometric under different conditions.

A "transducer" is any device having, as an output, an electronic signal that encodes a characterization of a biometric as a set of measured biometric values. If the output of such a device is not directly digital, then the term "transducer" includes any device additionally used to transform the output into digital form.

A "computing facility" means an electronic system having components that include a computing processor and a memory storing instructions that can be executed by the computing processor. A computing facility may be found, for example, in a desktop computer, a smartphone, a tablet computer, a wearable, a smart watch, and similar electronic devices. A computing facility also may be found in embedded computing systems that perform specialized computations, for example point-of-sale machines, automated teller machines (ATMs), physical access barriers, video display kiosks, and similar electronic devices.

A value is "sharded" when it is converted into individual components that, taken alone, reveal nothing about the value but, when combined, reveal the value. For example, x can be arithmetically sharded into $[x]_1$, $[x]_2$ as:

$$[x]_1 = r \bmod p$$

$$[x]_2 = x - r \bmod p$$

where r is a random integer, and p is a large prime number. One can see that $x = [x]_1 + [x]_2$, but $[x]_1$ and $[x]_2$ are each random (because r is random). This approach to sharding (namely arithmetic sharding) produces only one of a number of shard types, including, e.g., Shamir shards—polynomial interpolants, bitwise XOR shards, linear shards, function shares, etc.

A process recited as including "encoding and extracting into shards" may be carried out in any order, namely, in a first order, wherein the encoding precedes the extracting into shards, or in a second order, wherein the extracting into shards precedes the encoding.

As illustrated herein, a "shard" does not necessarily have to be a secret. Depending on context, the shard might be a secret or might not be a secret.

1 Transforming Biometric Data

Embodiments of the present invention provide computer systems and methods for transforming biometric data into a form that protects its privacy while permitting its indirect use for purposes including authentication. These embodiments are discussed below.

FIG. 1A is a block diagram of a computer system for performing enrollment and authentication in accordance with an embodiment of the present invention. FIG. 1A shows an individual (user) 103, a subject (user') 106, and at least two servers 101, 102, that constitute an array of servers. The individual 103 uses a mobile phone with software, called a client 104, (in this case is written in Javascript), which is software that runs on a web browser, and the web browser in turn runs on the individual's mobile phone. In the embodiment of FIG. 1A, the client 104 has access to the camera on the mobile phone to take pictures of the individual's face. The client 104 interacts with the user 103 and with the other entities on behalf of the user 103.

The subject (user') 106 uses a different device (client' 107), such as a different mobile phone, a laptop, a kiosk, etc. This device also runs client software.

In the embodiment of FIG. 1A, server 1, shown as item 101, is implemented in Go, and is deployed using Kubernetes in a Google Cloud Platform (e.g., in central United States). The server 101 has a Postgres database that stores the encoded shards used in the process. In addition to running a set of programs having application programming interfaces (APIs) for communicating with the server 2, shown as item 102, the set of programs running on server 101 also have APIs for communicating with the client 104. These APIs for communicating with the client 104 include, for example, APIs for enrolling, authenticating, and signing.

In the embodiment of FIG. 1A, server 2, shown as item 102, is implemented in Python, and is deployed in Amazon AWS (e.g., in eastern Europe). In this embodiment, the server 102 has a MySql database that stores the encoded shards used in the process. The server 102 has APIs similar to those of server 101, except written in Python on the server side.

In the embodiment of FIG. 1A, a series of processes are implemented, as follows.

First, an enrollment process is initiated (by the individual 103 or by another party). In this process, the client 104 requests the individual 103 to take a picture of the individual's face, and the individual 103 takes such a picture. Liveness detection is used with respect to the image of the individual's face in the picture.

Next, in the enrollment process, the client 104, using the captured image of the individual's face, creates enrollment shards, and sends the enrollment shards to the server 101 and server 102, which store the enrollment shards.

After enrollment, an authentication process is initiated (by the subject 106 or by another party). During the authentication process, the subject's client 107 requests the subject 106 to take a picture of the subject's face, and the subject 106 takes such a picture.

Next, in the authentication process, the subject's client 107, using the captured image of the subject's face, creates authentication shards, and sends the authentication shards to the server 101 and server 102, which store the authentication shards.

During a data exchange process of the authentication process, the servers 101 and 102 communicate with each other, with respect to the stored shards, to develop information relating to authentication of the subject, and each server 101, 102 sends a communication to the subject's client 107. The subject's client 107, in receipt of the communications, can then determine if the subject 106 was successfully authenticated as the individual 103. The subject's client can determine if the subject 106 was successfully authenticated without the subject 106 learning information about the enrolled individual 103.

The embodiment of FIG. 1A is privacy preserving, for example, because neither of the servers 101, 102 knows whether the subject 106 was successfully authenticated as the individual 103; neither of the servers 101, 102 nor the subject's client 107 gain access to the individual's biometric template (namely, an image of the individual's face); and neither of the servers 101, 102 gains access to the subject's biometric template (namely, an image of the subject's face).

The embodiment of FIG. 1A is also revocable, for example, because the shards stored by the servers 101, 102 are revocable. If a malicious subject 106 compromises the subject's client 107 and compromises all but one server, this embodiment prevents the malicious subject 106 from accessing information related to the individual 103. In the case of such compromise, in this embodiment, the credentials of the individual 103 (which can include the shards on the servers 101, 102) can be revoked and new credentials can be issued for the individual 103. In some embodiments, the issuing of the new shards can occur without the individual's involvement. Accordingly, if an external adversary is able to compromise all but one server, this adversary still learns nothing about the individual 103, and the credentials of the individual 103 can be revoked and new credentials issued without involving the individual 103.

In one embodiment of FIG. 1A, five sets of shards are generated during the enrollment process. Each server 101, 102 receives five sets of shards. During each authentication process, one of the sets of shards is destroyed. In this embodiment, when an authentication process is successful, a new set of shards is generated and distributed, using steps similar to the enrollment process.

This embodiment optionally includes a process to handle the case in which one or more servers in the server array goes down or is busy, offline, or otherwise unavailable. An exemplary process may include, for example, creating redundancy by creating multiple copies of each server. Another exemplary process may include performing sharding using techniques, such as Shamir shards, in which only a certain threshold number of shards are required, such as n out of m shards. In such a process, authentication is possible even when one or more servers with shards is not involved in the authentication process. In the event that one or more servers in the server array becomes unavailable, operations of enrollment and authentication can be carried out using a subset of servers in the array. Determination of the subset of servers to carry out such operations, can be based on a combination of one or more conditions including, for example: online status, availability, breach condition, capacity, location, privilege status, and security group.

The embodiment of FIG. 1A also addresses the concern of catastrophic credential loss, which can include, for example, a subject losing her password or token and an account reset is required. Account reset processes can be costly, such as because they involve expensive cost centers, users not completing their transaction, etc. Current account reset processes are not privacy-preserving, for example because they can default to having a central database of user information and the use of knowledge-based authentication (KBA), which can include asking a user questions about their favorite sports team or car they owned, to reset a user's account. This embodiment addresses catastrophic credential loss, for example because account access does not require remembering a password or having possession of a token, thereby avoiding the circumstances of requiring a reset due to a lost password or lost token.

In one embodiment, liveness detection is used to ensure the biometric is being taken of a real person. In one embodiment, liveness detection includes shining light on the face from different angles, while taking a picture of the face. In another embodiment, a neural net that is trained to detect the difference between photos of real people and photos of screens or photos is used. In one embodiment, an infrared camera is used in conjunction with an optical camera. In one embodiment, sensors detect a range of conditions, such as breathing, pulse, depth between finger print ridges. In one embodiment, the individual must participate in the liveness detection, such as by turning their head, speaking a phrase, or clicking a button. In one embodiment, the liveness indication is part of the digital electronic signal. In another embodiment, the liveness indication is contained within the shards.

In some embodiments, revocation processes do not need to include the creation of new shards. For example, regulations including the General Data Protection Regulation (GDPR) include a right to be forgotten or a right for individuals to have their personal data erased. Some embodiment's ability to perform revocation enables the right to be forgotten, even in the case of breach of servers and compromise of shards.

In some embodiments, revocation processes cause one or more shards to be useless in future authentication. In one embodiment, if the client and all but one server is compromised, an adversary learns nothing, and the credentials of the individual can be revoked and a new credentials issued. In one embodiment, a shard is a credential. In one embodiment, if the shard is revealed (such as by a breach or other compromise), the shard can be revoked and reissued. In one embodiment, a credential is a subset of the shards. In one embodiment, a credential is an encoded version of the biometric data. In one embodiment, a credential is a vector resulting from a neural net. In one embodiment, a credential is a biometric template. In one embodiment, issuing a new credential does not require the individual user. In one embodiment, the system of FIG. 1A is configured to require the individual user to issue new credentials. In another embodiment, the individual user is required to issue replacement shards. In one embodiment, a useless shard is called cancelled.

In one embodiment, the array of servers is five servers that each have unique shards and one of the servers is compromised. In one embodiment, to revoke the compromised shards, not all five servers have to be involved. There are several example ways to revoke the compromised shards, as follows (non-exhaustive list).

In one example, a subset (e.g., three) of the five servers in the array can cause the generation of new shards. The three new shards work in conjunction with the remaining two servers' original shards. The usefulness, for authentication, of the three original shards from the three servers in the subset is terminated from the authentication process. For example, if one of the three original shards was compromised, the compromised shard is made no longer useful in determining the success of future authentication attempts, and the security posture of the system is returned to that prior to the compromise of the one server.

In another example, the generation of three new shards by the three servers in the subset, terminates the usefulness of the remaining two original shards from the other two servers in the five-server array.

In another example, one server in the array deletes its shards, the action of which terminates the usefulness of all remaining shards held by the other servers in the array.

In the field of sharding, it is the case that one or more (but not every) shards being compromised does not compromise the individual's biometric. In the prior art, the compromised shards are a persistent security vulnerability. That is, they retain their usefulness to the authentication process. Thus, the security model becomes weaker with every shard that is compromised. But in embodiments of the present invention, the revocability capability (revoking the compromised shards) enables recovery of the security posture because the usefulness of the compromised shards may be terminated.

Assume a situation where a biometric has been sharded into 5 shards, and the compromise of 3 out of 5 shards would compromise the biometric. In the prior art, if one shard was compromised, only two more shards would need to be compromised to compromise the biometric. In embodiments of the present invention, however, the revocability capability enables recovery of the security posture (i.e., that 3 shards must be compromised to compromise the biometric) because the usefulness of the compromised shard may be terminated. Various embodiments uniquely allow a shard to be compromised without its compromise resulting in persistent compromising of the security of the system. The revocation capability limits the time frame during which an adversary may attempt to use a compromised shard, thereby reducing the attack surface. Because the revocation process can be performed by the servers without involvement of the client, revocation can be done very efficiently.

Figure 1B:
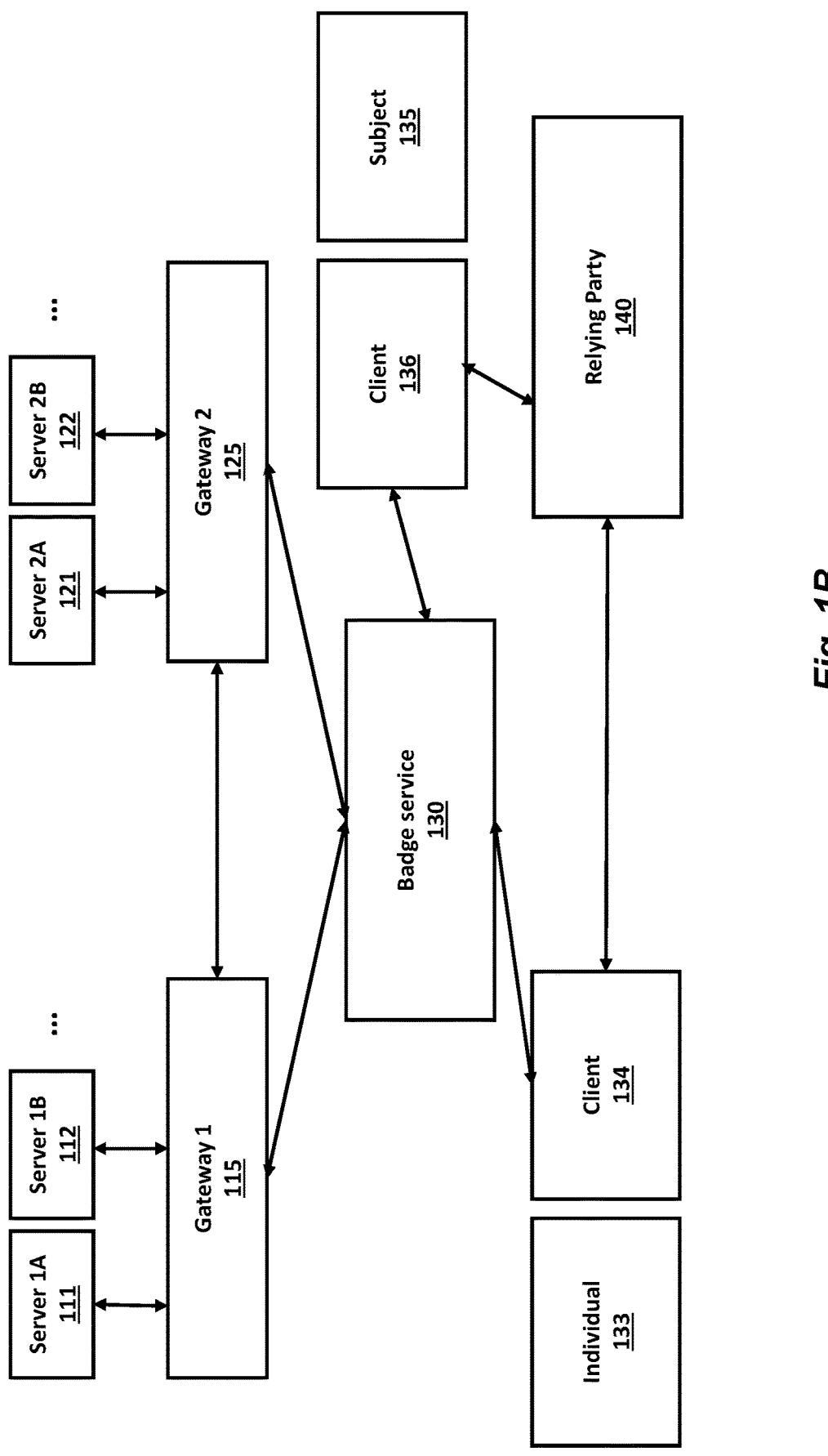
FIG. 1B is a block diagram illustrating another computer system for performing enrollment and authentication in accordance with an embodiment of the present invention.

FIG. 1B is a block diagram illustrating another computer system for performing enrollment and authentication in accordance with an embodiment of the present invention. Using the system of FIG. 1B, a relying party 140 authenticates users (individual 133, subject 135). The system of this exemplary embodiment includes:

The relying party (RP) 140, in one embodiment, is an enterprise, such as a pharmacy or bank, that wishes to authenticate its users in a privacy-preserving way, in compliance with HIPAA, GDPR, and/or other regulations, and in such a manner that they are not at risk of breach and reputational damage associated when user credentials are compromised, and in such a manner to offer a seamless user experience, such as in line with the enterprises' password-less, self-sovereign identity, digital identity transformation, non-custodial, decentralized, and compliance initiatives. The enterprise has a website, online marketplace, or digital payment gateway. In one embodiment, the website is written largely in Javascript and the RP has a MongoDB or other key-value store that stores the mapping from a username to the user's public key of a public-private signature key pair.

Client software (here written in Javascript) runs on a web browser, which in turn executes on the user's mobile phone. This software has access to the onboard camera to take pictures of the user's face. An instance of the software (client 134) interacts with the individual 133, who enrolls in the system, and with the other entities on behalf of the individual 133. An instance of the software (client 136) interacts with the subject 135, who purports to be the individual, and with the other entities on behalf of the subject 135. We sometimes term the individual's client 134, when it provides a biometric of the individual that is being enrolled for purposes of later authentication, a first "computing facility."

Badge service 130 encodes data from the user (individual 133 and subject 135). It also handles cryptographic operations with the derived biometric root private key. In embodiments, the service 130 is written in C++, and self-hosted by Badge. In one embodiment, each client 134, 136 performs the functions of the Badge service. In another embodiment, the Badge service 130 is hosted by a server. In another embodiment, each client 134, 136 is coupled to the Badge service 130. In another embodiment, the Badge service 130 is contained within the client 134, 136. Is another embodiment, the Badge service 130 is not contained within the client 134, 136. In one embodiment, the client 134, 136 is a front-end user interface and the Badge service 130 is the back-end. In one embodiment, the Badge service 130 performs the encoding and distributing of enrollment and authentication related information. In one embodiment, the client and service 134, 136, 130 are integrated with an existing client such as Windows Hello or Touch ID, and the servers 111, 112, 115, 121, 122, 125 are hosted in Azure, AWS, or other cloud platform.

The system of FIG. 1B includes a cluster of replicas of the server software corresponding to Server 1A 111, Server 1B, . . . . In embodiments, the server software is implemented in Go, and is deployed using Kubernetes in Google Cloud Platform and has a shared Postgres database that stores the users' encoded shares, which may be based on the biometrics and private keys. In addition to running a set of programs having APIs for communicating with the other servers, each server also runs a set of programs that have APIs for communicating with the clients. In one embodiment, these APIs include APIs for: enrolling the individual's secret shares of the encoded biometrics and the root private key, and performing authentication processes including these shares and secret shares of the subject's encoded biometrics.

The system of FIG. 1B also includes another cluster of replicas of server software corresponding to Server 2A 121, Server 2B 122, . . . . In embodiments, this server software is implemented in Python, and is deployed in Microsoft Azure in Central Europe. The cluster may include replicas of the Python version of server software, and has a shared MySql database that stores the users' encoded shares, which may be based on the biometrics and private keys. It provides APIs similar to those of the cluster of servers 1A 111, Server 1B, . . . , except written in Python on the server side.

Gateway 1 115 is a load-balancer (which may be written in Go) that routes traffic between different clients and different replicas in a way that minimizes the maximum load of a replica. In addition, the protocol, used in embodiments for loading balancing, requires the replica of server 1A 111 to find the exact replica of server 2A 121 that talks to the same client 134. The gateway 115 provides functionality to enable server 1A 111 to connect to the correct replica of server 2A 121. (In one embodiment, the mapping is dynamic depending on the load balancer. It could be, for example, determine dynamically that server 1A 111 is mapped to server 2G.)

Gateway 2 125 is a load-balancer that implements functionality similar to implemented by gateway 1 115, except written in Python (like cluster 2).

In the embodiment in FIG. 1B, a relying party 140 authenticates the subject user 135 using a series of enrollment processes are implemented as follows:

The individual 133 is asked to register or create an account by the Relying Party 140.

The individual 133 clicks an "enroll" option on the individual's client 134, which here functions as the first computing facility. The individual's client 134 requests the individual to take a face selfie picture, and the individual takes such a face selfie picture.

Next, the Badge service 130 and the individual's client 134 establish a secure, encrypted session.

The Badge service 130 securely communicates with the individual's client 134 using the secure, encrypted session. The Badge service 130 encodes data associated with the captured image of the individual's face so as to generate biometric data, which is fed through a deep learning neural net that outputs a vector.

The Badge service 130 generates shards using the vector.

The Badge service 130 causing distribution of the generated shards to the servers 111, 112, 121, 122. Within the secure, encrypted session, the individual's client 134 receives the root private key and derives an ECDSA (Elliptic Curve Digital Signature Algorithm) public and private key pair that is used for signing. In one embodiment, neither the ECDSA public or private key need to be stored because they can be re-derived when needed. In one embodiment, the individual's client 134 derives separate key pairs for use with different relying parties and applications. In one embodiment, some key pairs are used for data encryption. In one embodiment, the individual's client 134 sends the ECDSA public key to the Relying Party 140. The Relying Party 140 stores the public key, or uses a certificate authority or registration authority to store the public key in a public key database. In one embodiment, the Badge service 130 contains the certificate authority, registration authority, and/or public key database. In one embodiment, the Relying party 140 stores the public key and reports success to the individual's client 134. The individual's client 134 indicates successful enrollment to the individual.

In this embodiment, the shards may include one or more of the items on the following list of possible constituents. Any item on this list might have a plurality of occurrences.

1. Arithmetic shards of biometric data;
2. MAC codes for Arithmetic shards of biometric data;
3. Beaver triples;
4. MAC codes for Beaver triples;
5. Arithmetic shards of a random value (e.g., alpha, r);
6. MAC codes for arithmetic shards of the random value;
7. Commitments for arithmetic shards of the random value;
8. Arithmetic shards of MAC key (call the MAC key 'D'); and
9. Function secret shares of function.

In this embodiment, beaver triples are arithmetic shards of $\{x, y, x*y\}$ for randomly chosen x and y. In some embodiments, encoding includes encoding the above into the generated shards.

In one embodiment, the MAC code is thought of as being a part of the share itself. "Authenticated arithmetic share" is the tuple of a share and its MAC code. For example, for a shard of 'a', the corresponding MAC code is a shard of $(a*D)$, where 'D' is the MAC key. In this embodiment, the shards may include one or more of:

1. Authenticated arithmetic shards of biometric data;
2. Authenticated Beaver triples;
3. Authenticated arithmetic shards of random value alpha;
4. Arithmetic shards of MAC key; and
5. Function secret shares of a function In one embodiment, a commitment value can be used to check whether the values that have been committed have been modified. For example, the commitments for shards of r are used to check whether the shards of r have been modified. In one embodiment, a commitment is a hash.

In one embodiment, authentication of the subject includes receiving and storing, by the second computing facility, one or more of:

Arithmetic shards of random value r,

MAC codes for arithmetic shards of r, and

Commitments for arithmetic shards of r.

In one embodiment, the shards of r are received from the array of servers. A further embodiment includes:

confirming, by the second computing facility, using the commitments for arithmetic shards of r, that none of the array of servers was actively malicious, or otherwise compromised such that the shards of r have been modified; and generating, by the second computing facility, r from the shards of r.

In one embodiment, authentication includes:

generating, by the second computing facility, blinded shards from the digital electronic signal of the subject and the shards of r; and broadcasting, by the second computing facility, the blinded shards to the array of servers.

In another embodiment, authentication includes: causing the array of servers to be in possession of shards of the digital electronic signal of the subject.

In one embodiment, authentication includes: generating, by the array of servers, shards of the digital electronic signal of the subject and associated MAC, using the blinded shards and the shards of r.

In one embodiment, the above processes reveal to the array of servers, by use of the MAC codes of the shards, whether any of the array of servers was actively malicious, for example, if it modified any shards. In a further embodiment, if it is detected that a server is actively malicious, a security process or breach of contract legal process is performed. For example, if a third party's servers were compromised resulting in modification of shards, appropriate processes and legal or indemnification actions for the dispute may be initiated.

Alternatively or additionally, in another embodiment, authentication includes:

receiving, by the second computing facility, data exchange information, from the array of servers; and confirming, by the second computing facility, using the data exchange information, that the subset of the array of servers were not malicious.

In a further embodiment, if a server is found to be malicious, a security process is performed.

Alternatively or additionally, in another embodiment, authentication includes:

generating and distributing additional values, such as commitments or hashes of the shards of the digital electronic signal of the subject; and receiving and storing by the array of servers the generated shards and additional values.

In one embodiment, the above processes reveal to the array of servers, by use of the MAC codes of the shards, whether any of the array of servers was actively malicious.

In one embodiment of the system wherein a relying party 140 authenticates a subject 135 purporting to be the user 133, authentication processes are implemented as follows:

The subject 135 tries to login to the relying party's application, requesting the login on the subject's client 136, in this case acting as a second computing facility for purposes of authentication.

The subject's client 136 (e.g., running on the subject's device) sends the request for user authentication to the relying party 140, which is using what we call a third computing facility.

The relying party 140 returns a challenge to the subject's client 136, which includes a request to sign a message with the ECDSA private key.

The subject's client 136 requests a face selfie of the subject 135.

The subject 135 takes such a selfie of her face.

The subject's client 136 and Badge service 130 establish a secure, encrypted communications channel.

The Badge service 130 encodes and generates shards.

The Badge service 130 distributes a subset of shards to the plurality of servers 111, 112, 121, 122.

A subset of servers 111, 112, 121, 122 perform a data exchange process.

A subset of the subset of array of servers 111, 112, 121, 122 send information to the Badge service 130.

The Badge service 130 uses the information to re-derive the root private key.

The Badge service 130 communicates with the subject's client 136 on the secure, encrypted channel in a manner to enable the subject's client 136 to re-derive the ECDSA private key.

The subject's client 136 signs a message with the ECDSA private key.

The subject's client 136 transmits the signed message to the relying party 140.

The relying party 140 verifies the signature using the ECDSA public key (which was previously stored for access by the relying party 140).

If the signature is valid, the relying party 140 successfully authenticates the subject 135 as the individual 133. In one embodiment, the relying party 140 grants access to the subject's client 136 to access an application.

The result of the authentication is reported to the subject 135.

The subject 135, once authenticated as the individual 133, accesses the relying party's application. In one embodiment, the subject 135 views her account balance. In another embodiment, the subject 135 views the results of her medical tests. In another embodiment, the subject 135 unencrypts messages, a payment wallet, or other data. In another embodiment, the subject 135 signs a document or other data using a digital signature. In one embodiment, the subject 135 signs a transaction e.g., to be accepted and recorded by a distributed ledger, block chain, or transaction processing stack.

In some embodiments, the output value is a key if the subject is authenticated as the individual, and the output value is all zeros if the subject is not authenticated as the individual. In one such embodiment, the third computing facility uses the output value/key to derive an ECDSA private key. Further, the third computing facility performs signature-based authentication using the ECDSA private key to authenticate to a fourth computing facility. In such an embodiment, the third computing facility receives a token enabling access to an application from the fourth computing facility. In another embodiment, encoding includes processing biometric data for generation of a biometric template. In one embodiment, the deep learning neural net is provided by another entity, such as a biometrics vendor. In another embodiment, the biometric data is processed using a feature extraction and/or alignment algorithm that outputs a biometric template. In another embodiment, face biometric data is fed through a face-trained neural net that outputs a first vector, and voice biometric data is fed through a voice-trained neural net that outputs a second vector, and the two vectors are combined e.g., using a tensor product, for generation of a biometric template.

Some embodiments of the present invention can uniquely leverage multiple biometric inputs. For example, if each biometric input is fed through a machine-learning model and has an output in metric space, these embodiments can generate shards from these biometric input. In embodiments, the Badge service 130 uses machine learning to generate vectors and then uses the generated vectors as inputs of the authentication process. The use of machine learning applies to multiple biometric and non-biometric inputs, and also applies to multiple vectors. In one embodiment, these techniques are leveraged during generating shards from the digital electronic signal.

In one embodiment, the digital electronic signal is a video that includes facial images and a voice of a person. The facial image will go through its own neural net and the voice will go through its own neural net. Each neural net will produce a vector at the time of enrollment (namely, what we call an "enrollment vector") and, again, at the time of authentication (what we call an "authentication vector"), such as a face vector and a voice vector. These two vectors are merged (with or without additional information) to create an input vector. For example, the face vector and voice vector may be combined with a pin code, to create a merged vector. As a further example, the additional information may include a set of metadata that indicates what type of biometric input the vector is derived from. In one embodiment, the computing facility takes the input vector and uses it to generate shards. In this way, shards can be generated based on vectors of multiple biometrics. In an alternative embodiment, there are two digital electronic signals, one for face and one for voice. In one embodiment, generating includes obtaining an output in metric space that was created using a neural net whose input includes a component of the digital electronic signal. The output in metric space can include a vector. The biometric data can be represented as one or more vectors in a metric space. In one embodiment, the vectors are generated using a neural net or deep learning model. In accordance with various embodiments of the present invention, processes, configured to preserve privacy of biometric data, for authentication involve the calculation of distances (between authentication and enrollment vectors) in metric space and comparing the calculated distances against a threshold.

The above described neural nets may have a given performance in terms of False Accept Rate (FAR) and False Reject Rate (FRR). Some embodiments of the present invention provide a way to perform privacy preserving authentication without degrading the FAR and FRR performance at a given threshold.

In this way, these embodiments provide a uniform approach to using arbitrary modalities of biometrics—the above deep learning approach can be used with face authentication, voice authentication, behavioral authentication, etc., as well as with more traditional biometric modalities such as fingerprint, iris, retina, palm, etc. The architecture in some embodiments enables uniform support of biometric modalities that have not yet been invented. Such architecture also enables uniform support of the above in combination with factors such pins, tokens, patterns, passwords, etc.

In various patterns of authentication described in this application:

an individual can use one or more modalities (such as face, voice, fingerprint, periocular face, pin, password, S SID, token, etc.) to enroll;

and then can authenticate with a subset of these modalities;

and can enroll additional modalities over time;

and (as explained in the following paragraphs) some of these modalities can be compromised without compromising the system.

For example, the fingerprint biometric might be compromised—in an event unrelated to the technology described herein—when fingerprint templates stored in a database elsewhere are compromised, but this compromise of conventional technology does not result in compromising a system in accordance with an embodiment of the present invention. In another example, if an underlying private key is compromised, this compromised key can be revoked in accordance with embodiments of the present invention. As another example, when it is determined that a password should not be used anymore, the password can be eliminated as a valid modality for authentication. In some embodiments, this determination is made by the user, and in other embodiments the determination may be made by an organization such as a bank or government agency, or automatically when a set of conditions has been established to justify the determination.

In some embodiments, the nature of a proposed use of information governs selection of a tier of security risk associated with such use and consequently the authentication factors required to implement such use. For example, herein, under one scenario only the individual's face is required to log in to see the individual's bank balance, but then, in another scenario, to perform a transaction, which involves a higher tier of security risk, the individual would be required to pass requirements of face recognition as well as voice recognition. In yet another scenario, for example, involving a change of an individual's address, in addition to biometric requirements, there may be imposed a requirement for providing a secret, such as a user's PIN. Other examples include an organization choosing which input factors or combinations are required, for example based on user convenience relative to the application or transaction for which the user desires access, or, in another example, based on a security policy.

In some embodiments, for each factor or modality that the individual enrolls with, one or more separate minor keys are derived. A subset of the set of minor keys may be sufficient to authenticate the subject as the individual. Upon enrollment, a major key may be generated that is related to the minor keys. The major key may be derived from the minor keys. In some embodiments, all minor keys are required to re-derive the major key. In some embodiments, the major key operates like a master key.

In some embodiments, the compromise of a minor key does not compromise any other keys. Minor keys can be revoked. In some embodiments, the major key can be updated to no longer be related to a revoked minor key. For example, the major key can be updated to no longer contain a revoked minor key.

In some embodiments, minor keys and major keys may be ECDSA or RSA keys and may be used in standard cryptographic operations, such as signing and encryption. In one embodiment, the major key is an ECDSA key that encompasses the minor keys. In one embodiment, a Diffie Helman process is used to combine minor keys to generate a major key. In some embodiments, generating a key includes generating a secret and deriving a private/public key pair from it, such as an ECDSA key pair and others as known in public key infrastructure.

In one embodiment, the set of minor keys that are re-derived during authentication are a subset of the major key, and if this subset is determined to be sufficient for authentication, the server accepts the set membership proof. In one embodiment, the determination of what is sufficient is made at the time of enrollment. In one embodiment, the threshold of what subset is determined to be sufficient can be dynamically set by an organization (e.g., it does not have to remain static from the time of enrollment). Further, the threshold may be as low as a single partial modality or as high as all modalities, depending on an organization's preferences, such as for user settings and security.

In some embodiments, there are one or more minor keys for each factor or modality. For example, for a given user, there could be a minor key for each partial fingerprint on each finger of each hand. In another example, all ten fingerprints and two palms of a user have one minor key. In another example, for a given user, there are separate minor keys for each type of face scan, such as visual, infrared (IR), three dimensional (3-D), etc. In one example, there is a separate minor key for a user's face scan in each of several separate conditions, such as low light, wearing glasses, wearing a facemask, with a head covering, outdoors, on a phone, using a wearable camera, with a beard, etc.

In certain embodiments implementing minor and major keys, during authentication, one of the minor keys is generated. In some of these embodiments, it can be shown that the minor key is associated with the user's major key as follows:

x and y are minor secret keys; and if major secret key is x*y, with public key g^{x*y}, a minor key x with associated public key g^x can be verified to be a part of the major secret key using g^y to compute g^{x*y} and verifying equality with the major public key.

This allows demonstrating that derived key is a member of the keys the individual enrolled with—even if the subject does not use all modalities during authentication. In some embodiments, this also allows for specific key revocation: if x is compromised, then all minor keys that include x can be revoked. In these embodiments, compromise or revocation of x does not reveal information about other keys (e.g., y) and does not impact the functionality of other keys.

In some embodiments, the minor keys may be extracted individually from their respective modalities, and these keys may be combined incrementally. For example, the face minor key and the PIN minor key may be extracted. These two keys could be used, for example, for a login authentication process. Then, to perform a step-up-authentication process, a service could request that the voice key also be extracted. In this embodiment, the voice key can be extracted and combined with the previously extracted face and PIN keys to obtain a key used for the step-up-authentication process.

The causing distribution of shards in the embodiment of FIG. 1B is based on a combination of one or more conditions including: online status, availability, breach condition, capacity, location, privilege status, decentralization, load balancing, history, performance, a scheduling algorithm, or security group. For example, if multiple servers 111, 112 in a cluster have been compromised, other servers in that cluster may not receive the distributions. For example, the gateway 115 or gateway 125 could pick which servers in the cluster to use to achieve load balancing. For example, the Badge service 130 or the client 134, 136 could indicate a preference for which servers receive the distribution. For example, multiple servers may receive one or more shards that another server also receives. In another example, no server receives the same shard that another server receives.

Such "causing distribution" does not by itself require a particular pattern of distribution, and a range of patterns of distribution can be employed depending on context of the relevant computer processes. Under one pattern of distribution all servers get the same information, and that information may or may not be public. Under one further scenario, the information might be "blinded," as that term has been used herein. In another pattern, for example, different servers get different information, which may be overlapping, or not, and which, generally is not public information. A variety of methods of distribution may be employed. In one scenario, for example, the distribution method may involve providing further information to a server to allow it to interpret information previously delivered to it.

In one embodiment, within a secure encrypted session between the client 134, 136 and the Badge service 130, the client 134, 136 receives the root private key and derives an RSA public and private key pair that is used for signing. In another embodiment, the Badge service 130 derives the key pairs and posts the public keys to a public key directory, which in some embodiments is accessed by certain relying parties and applications. In one embodiment, neither the RSA public or private key need to be stored because they can be re-derived when needed. In one embodiment, the client 134, 136 derives separate key pairs for use with different relying parties and applications. In one embodiment, some key pairs are used for data encryption. In this way, the human is the root of trust (instead of a hardware or physical root of trust, or a software root of trust, that could be lost or compromised). The human root of trust can, on-demand, re-derive key pairs to authenticate to, sign, encrypt, or provide other functions with relying parties, services, and applications.

In some embodiments, the system of FIG. 1B includes more than two server clusters. In this embodiment, the system architecture in FIG. 1B is changed such that the Badge service 130 is connected to the additional server clusters. In one embodiment, the servers or server clusters have a point-to-point connection with every other server or cluster. In one embodiment, the servers will have a series of broadcasts among themselves to carry out a MPC protocol.

In embodiments, the system communicates that the subject is authenticated to the relying party (sometimes herein "RP") in varying manners. In one embodiment, the relying party communicates with the individual's client at enrollment (as depicted in FIG. 1B). To do so, the client (after enrolling) sends some information to the relying party that links the Badge account to the relying party's account. For example, this can be achieved using the standard OAuth protocol. In another embodiment, the relying party communicates with the Badge service acting as a certificate authority (CA) that registers its root certificate with the relying party. The Badge service can then send signed messages that the client is authenticated that can be verified by the relying party. In yet another embodiment, the relying party has no communications except with a secondary client. In this case, a third-party CA (e.g., COMODO) issues the Badge service a certificate, which it uses to sign authentication messages. The relying party verifies these signed authentication messages using a protocol, e.g., standard Transport Layer Security (TLS).

1.1 Data Encoding

In some embodiments, user U has a biometric template T that can be represented by a set of features and that there exists a subset of points $P \subseteq T$ that corresponds to the entropy of the template. In one embodiment, each feature is an element of the same universe, and the universe must be finite and have a total ordering. In some embodiments, this total ordering must be known to both U and $U^I$, and may be constant or vary depending on one or more authentication factors, which could include, for example, a pin, password, characteristic of an ear canal, biometric data. To state the conditions of these embodiments differently, there exists a subset of points that represents the randomness of the biometric data. Let us call the subset of points P, the entropic points. In one embodiment, an encoding algorithm is used to encode T to an encoded template $E_T$ and an algorithm $f$ that performs authentication given the encoded template $E_T$ and the entropic points $P^I$ of a second template $T^I$ where $T^I$ is generated by user $U^I$. That is, $f(E_T, P^I)=1$ if the user $U^I$ is the same as U, and $f(E_T, P^J)=0$ otherwise. Note that this means the function is symmetric, in that $f(E_T I, P)=1$ if and only if U is same as $U^I$ as well.

An example of such a biometric template and encoding scheme is representing a two-dimensional face or fingerprint template as a list of (x, y) coordinates of the features associated with the template. The encoding and the entropic points are precisely the list of (x, y) coordinates, and the corresponding $f$ would check if each of a large fraction of entropic points of the second template has a corresponding point in the first template that is within a small Euclidean distance. The choices of encoding and $f$ can be made such that they improve performance.

1.2 Communications for Enrollment and Authentication

In some embodiments, enrollment (also referred to as registration) is carried out between an honest individual and a plurality of servers. The purpose of enrollment is to enable the individual to authenticate herself at a later point. After enrollment of the individual, authentication is carried out between a subject, who may or may not be the same as the enrolled individual, and the plurality of servers.

Figures 1C, 1D:
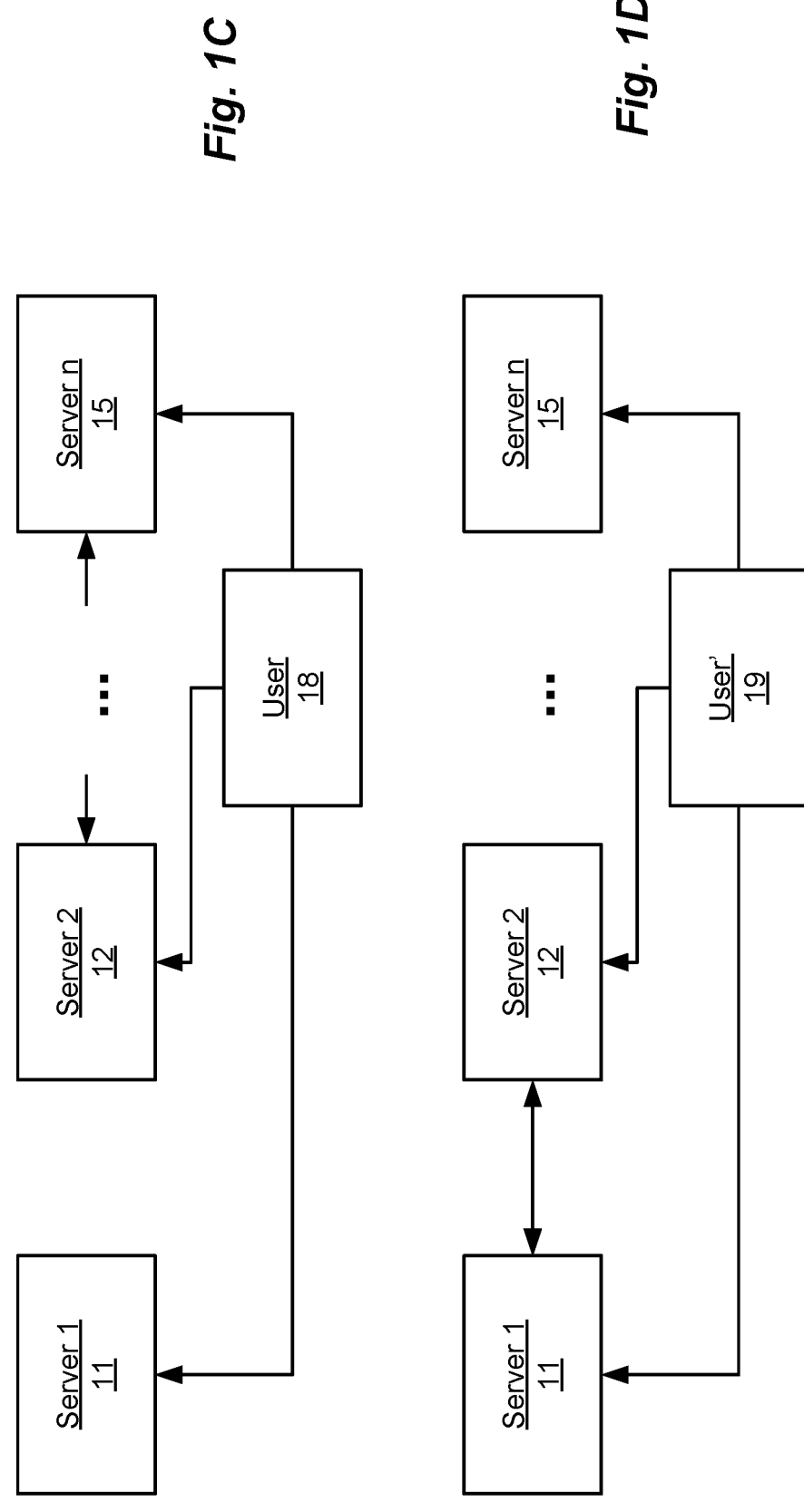
FIGS. 1C and 1D are block diagrams illustrating communication paths for enrollment and authentication respectively in a computer system using n servers in accordance with an embodiment of the present invention.

FIGS. 1C and 1D are block diagrams illustrating communication paths for enrollment and authentication respectively in a computer system using n servers in accordance with an embodiment of the present invention. In enrollment in FIG. 1C, individual, User (U) 18, enrolls with the system by sending her sharded data to each server 11, 12, . . . , 15. In authentication in FIG. 1D, subject, User' ($U^r$) 19, attempts to authenticate herself as the User (U) 18 by communicating with the servers 11, 12, . . . , 15. In the embodiment of FIGS. 1C and 1D, the servers 11, 12, . . . , 15 must also communicate with each other.

In one embodiment, we assume that at least one of the servers 11, 12, . . . , 15 is honest, meaning that it will follow the protocol for authentication in this embodiment correctly, and it will not reveal any of its private values. If at least one server is honest, the following goals can be achieved:

Correctness. If the subject is the individual and the servers and the subject follow the protocol without deviating from the protocol, then the servers are convinced that the subject is the individual.

Soundness. If the subject is not the individual and at least one server is honest, then the honest server will not be convinced that the subject is the individual, and authentication will not succeed.

Zero-knowledge. For example, if at least one server is honest, then no server should learn the biometric data of the individual or subject. Furthermore, even if the subject is malicious in this scenario, neither the subject nor any server will learn anything about the biometric template of the individual during the authentication protocol.

Zero-knowledge is related to privacy preservation. In some embodiments, even if all but one of the servers is actively malicious:

the output value is not revealed to the computing facility or the plurality of servers;

neither the individual's biometric data nor the subject's biometric data (nor the digital electronic signal that characterizes a biometric of the subject) is revealed to the servers; and the servers do not obtain intermediate values of the multiparty computation.

2.3 Brief Background of MPC

There are many different forms of multiparty computation (MPC), including methods that perform computation on "sharded" values. A "sharded" value is a value x that is shared across two or more servers. The shards alone reveal nothing about x, but only reveal x when combined. For example, x can be arithmetically sharded into $[x]_1$, $[x]_2$ as:

$$[x]_1 = r \bmod p$$

$$[x]_2 = x - r \bmod p$$

where r is a random integer, and p is a large prime number. One can see that $x = [x]_1 + [x]_2$, but $[x]_1$ and $[x]_2$ are each random (because r is random).

We describe here method of sharding data (arithmetic sharding). There are also multiple other methods of sharding data. A process to shard secrets (including e.g., Shamir shards—polynomial interpolants, bitwise XOR shards, linear sharding, etc.) may be used as well.

MPC allows us to perform complex operations on these sharded values including addition, multiplication, and integer comparison. These operations occur entirely on sharded values to generate shards of the result of the computation. The servers then reveal these output shards to learn the result of the computation together. In this way, the set of servers learns only the output of the computation and not the input or any intermediate values.

While MPC is general and powerful, it is also expensive and therefore impractical for many applications. For example, in the above sharded protocol, certain operations are more expensive than others. Specifically, each multiplication and comparison operation is expensive. The operations typically require a separate offline "setup" phase involving large amounts of computation and communication.

This setup phase is so expensive (both in terms of computation and communication) that it renders most MPC impractical for most applications. Even the online phase (occurring after the setup phase) can be impractical, as each multiplication and comparison operation requires information to be exchanged among all of the participating servers. This process can be costly in terms of time (on the order of 200 ms-500 ms), owing to network latency among other factors.

Finally, many approaches that deal with these shortcomings sacrifice security. That is, many protocols protect only the user's data if all servers obey the protocol honestly. This security model is in general too weak for practical applications.

The sharding described above shards a value. Function secret shares are a mechanism to shard a function instead of a value. Functionally, they work in a similar fashion to the sharding described above. The key difference is that instead of sharding a value (x) and jointly computing a known, shared function (f), you are sharding a function (f) and computing on a known, shared value (x).

2.0 Secure Subset Selection

In accordance with embodiments of the present invention, we develop and use a sharded subset protocol. A sharded subset protocol includes two phases: setup (corresponding to what we have sometimes called "enrollment") and select (corresponding to at least part of what we have sometimes called "authentication"). The setup phase is carried out between servers $S_i$, at least one of which is honest, and a trusted third party U. The select phase is carried out between the same servers, and another third party $U^I$ who may or may not be trusted. The high level goal of a sharded subset is to allow the trusted party U during the setup phase to "commit" some messages $M=\{msg_i\}_{i=1}^n$ to the servers. At a later point, in authentication, the protocol should allow $U^I$ to select a subset of the messages of a fixed size $f$ without learning the content of the messages, and a given server $S_a$ should then learn the content of the subset $\{msg_j: j \in \Phi \wedge \Phi \subset [n] \wedge |\Phi|=f\}$ without learning the indices of the chosen messages $\Phi$. That is, at the end of the protocol, one of the servers will have access to a subset of the plaintext messages U committed, but which particular messages were chosen to form this subset remains hidden. For sake of formally specifying the protocol, let $M'=\{msg'_j\}$ be the set of messages the given server $S_a$ possesses at the end of the protocol, and that $S_a$ outputs 1 if $M' \subset M$, or it aborts otherwise. As described herein, in connection with authentication more generally, there are three goals for a sharded subset, correctness, soundness, and zero knowledge.

Correctness: If all participants are honest, then the protocol will not abort and the given server $S_a$ outputs 1 with probability 1. Moreover, if $S_a$ and $U^I$ are both honest and the protocol does not abort, then $M^I$ is exactly chosen using $\Phi$.

Soundness: If $S_a$ is honest and if $M' \not\subset M$, then the protocol aborts with overwhelming probability, regardless of how the other servers and $U^I$ cheat.

Zero-knowledge: No server should learn anything about $\Phi$ as long as one server remains honest. Moreover, $\{S_i\}_{i \neq a}$ and $U^I$ should learn nothing about the underlying plaintext messages, as long as the given server $S_a$ is honest.

3.0 Enrollment and Authentication Protocols

We now describe how individual U may store its biometric template on the servers securely, and subject $U^I$ can authenticate itself at a later point. Portions of this description expand on concepts disclosed in PCT publication WO 2017/083732, filed on Nov. 11, 2016, which is hereby incorporated herein by reference in its entirety.

Figure 4:
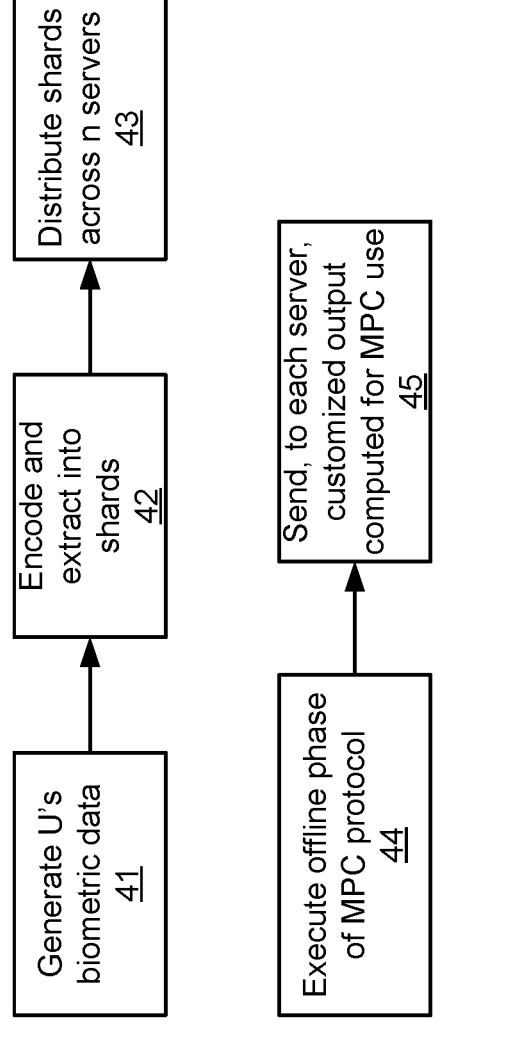
FIG. 4 is a diagram of logical flow of an enrollment process, in accordance with an embodiment of the present invention.

FIG. 4 is a diagram of logical flow of an enrollment process, in accordance with an embodiment of the present invention. During enrollment, in process 41, a first biometric computer system causes generation of biometric data for an individual U, and, in process 42, encodes and extracts into shards the generated biometric data. (The encoded biometric data corresponds to template $E_T$, which is compliant with section 1.1.) The encoded biometric data appears in n shards, where n is the number of servers. In process 43, the first biometric computer system distributes the n shards across the n servers. In a further related embodiment, additional (optional) processes are carried out by the first biometric computer system. In particular, in process 44, the first biometric computer system executes an offline phase of the MPC protocol that later is used in authentication. In process 45, the first biometric computer system then sends, to each server, a customized output that has been computed for use in the MPC. (It will be recalled, from section 1.1, that, for authentication, the MPC uses the algorithm that corresponds to f.)

Figure 6:
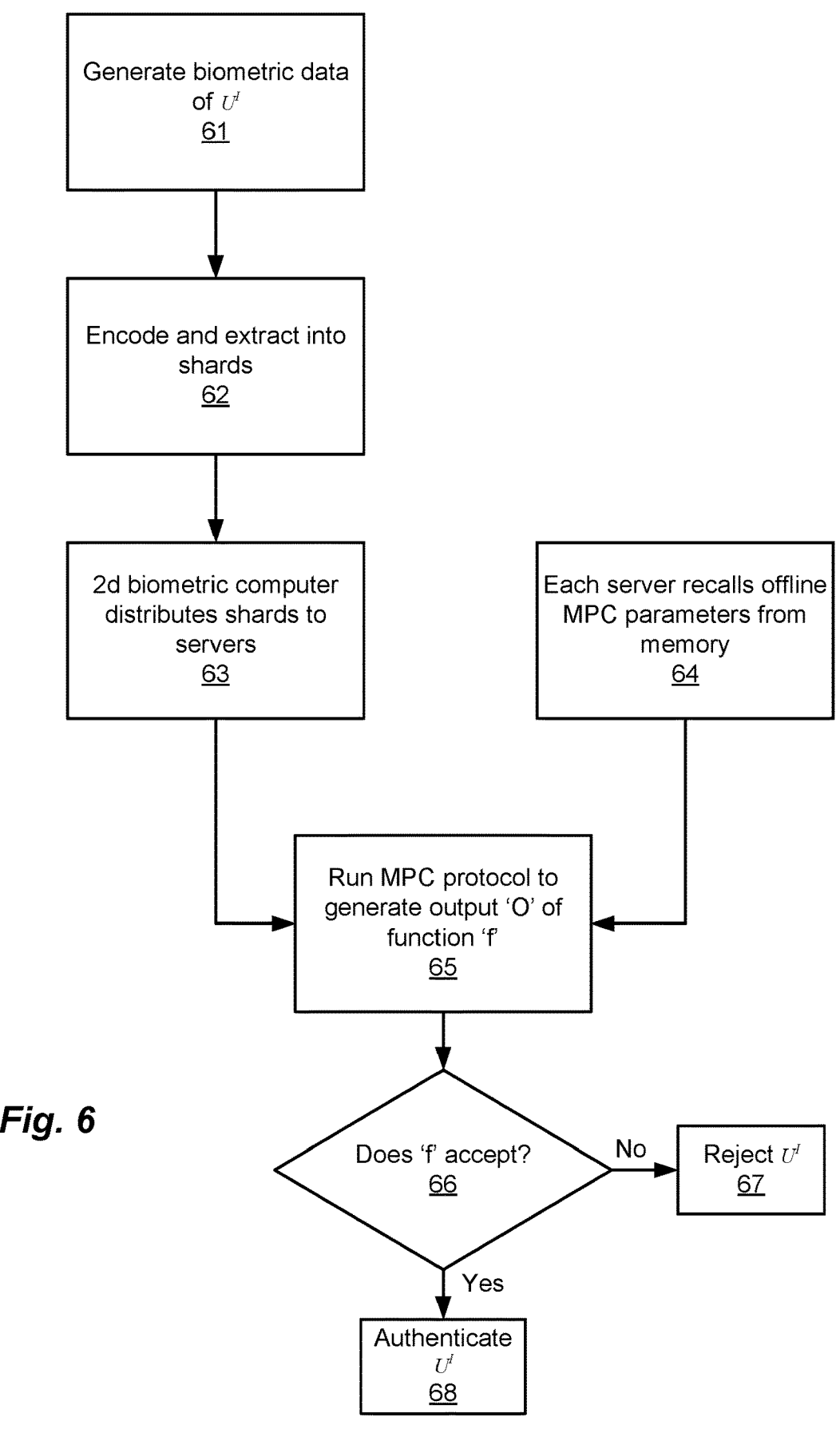
FIG. 6 is a diagram of logical flow of an authentication process, in accordance with another related embodiment of the present invention.

FIG. 6 is a diagram of logical flow of an authentication process, in accordance with another related embodiment of the present invention. During authentication, in process 61, a second biometric computer system generates biometric data of the subject. Then, in process 62, the second biometric computer system encodes and extracts into shards the biometric data of the subject. The biometric data thus encoded constitute the entropic points $P^I$ (first mentioned in section 1.1 above). In process 63, the second biometric computer distributes the n shards across the n servers. In process 64, each of the servers recalls from memory the MPC parameters that were precomputed from U in the offline phase (processes 44 and 45 in FIG. 4) of MPC. In process 65, the servers compute $f(E_T, P^I)$ without learning anything about $E_T$ and $P^I$. In one embodiment, function 'f' is a biometric match function. In one embodiment, this computation results in shards of an output value O. In one embodiment, the shards of O are returned to the subject, who then reconstructs these shards to recover O. In one embodiment, if the final output O is 1, then the subject is authenticated as the individual. Otherwise, the subject is not authenticated as the individual.

In another embodiment, the servers may recover O without returning any shards to the user. In one embodiment, if the final output O is 1, then the subject is authenticated as the individual. Otherwise, the subject is not authenticated as the individual.

In another embodiment, O may be chosen arbitrarily at enrollment to be any value. In one embodiment, O may be chosen to be a secret key (or shard of a secret key, if more than one factor is being used).

In another embodiment, the second biometric computer causes the servers to compute a MAC code for the shards of the subject. These MAC codes are used over the course of determining the servers computing $f(E_T, P^I)$. MAC codes are returned along with the shards of O. The subject then checks this MAC code prior to reconstructing O to determine whether the servers computed $f(E_T, P^I)$ correctly and did not learn anything about $P^I$.

In another embodiment, the servers use protocols including SPDZ and/or function secret shares to compute $f(E_T, P^I)$.

In another embodiment, a second biometric computer causes biometric data of a subject purporting to be the individual to be generated and shards the biometric data of the subject and distributing, across the plurality of servers, the shards of the subject. The distribution of the shards causes the servers to compute a MAC code for the shards of the subject and each of the servers to execute a multiparty computation algorithm to determine a blinded value match score for the sharded biometric data of the subject in relation to the corresponding sharded data of the individual. Each of the servers use the blinded match score to compute a corresponding function share, and to return, to the second biometric computer, the computed function share along with values for the MAC codes previously computed. The second biometric computer uses the function share data to determine whether there has been a determination of a match and to evaluate the MAC codes to confirm the authenticity of the function share data.

In process 66, each of the servers is programmed to accept or reject individually. In one embodiment, the programming is done in such a manner that a server does not learn whether it accepted or rejected. In addition, it does not learn whether any of the other servers accepted or rejected. In one embodiment, it is not possible to determine from a given server's shard of the output value whether the output value indicates that the subject is authenticated as the individual or not." An authentication process 68 is successful if and only if a sufficiently large subset of servers accept in process 66.

The following are two examples where, in some embodiments, not all servers accept in process 66.

In a first example not all the servers accept based on redundancy. In one embodiment, more than one server received the same shards during enrollment/authentication. In that case, more than one server will produce the same output shard. In one embodiment, authentication requires only one instance of each output shard. If two servers who received the same shards produce different output shards (for example because one server is malicious or malfunctioned), and a subset of the output shards result in successful authentication, then the subject is successfully authenticated as the individual. In one embodiment, if it is possible to recover an output that confirms authentication, then the subject is successfully authenticated as the individual.

Alternatively, in another embodiment: Server 1 received enrollment shard 1 and authentication shard 1. Server 2 received enrollment shard 1 and authentication shard 2. Server 3 received enrollment shard 2 and authentication shard 1. Server 4 received enrollment shard 2 and authentication shard 2. It is possible to authenticate using only servers 1 and 4. Or it is possible to authenticate using only servers 2 and 3. If either servers 1 and 4 or servers 2 and 3 confirm authentication, the subject is authenticated as the individual.)

In a second example, certain methods of sharding, such as Shamir sharding, result in a situation where only a certain number of shards are needed to recreate the secret (in this case the secret is the output value)—n out of m shards is sufficient.

The exemplary methods described in examples 1 and 2 above may be selected for reasons including that sometimes servers go down, become unavailable, malfunction, go offline, or servers can be malicious.

In one embodiment, every server coupled to a given gateway receives the same shards. In such embodiment, during a given authentication attempt, each gateway selects one server coupled to it to participate in the data exchange process (such that one server from each gateway is participating). In the event of a failed authentication, authentication may be retried, either depending on certain conditions or automatically. During this retry, each gateway may choose (such as based on an internal scheduling or load balancing algorithm) to assign a different server than was used in the prior attempt. In this way, the array of servers participating in the first authentication attempt may be a different subset of servers than participating in the second authentication attempt. This mitigates the potential for single points of failure in the array of servers or the subset of servers.

Now we describe another embodiment in connection with FIG. 4. FIG. 4 is a diagram of logical flow of an enrollment process, in accordance with an embodiment of the present invention. During enrollment, in process 41, a first biometric computer system causes generation of biometric data for an individual U, and, in process 42, encodes and extracts into shards the generated biometric data. (The encoded biometric data corresponds to template $E_T$, which is compliant with § 1.1.) The encoded biometric data appears inn shards, where n is the number of servers. In process 43, the first biometric computer system distributes the n shards across the n servers. In a further related embodiment, additional (optional) processes are carried out by the first biometric computer system. In particular, in process 44, the first biometric computer system executes an offline phase of the MPC protocol that later is used in authentication. In process 45, the first biometric computer system then sends, to each server, a customized output that has been computed for use in the MPC. (It will be recalled, from section 1.1, that, for authentication, the MPC uses the algorithm that corresponds to $f$.)

Figure 2:
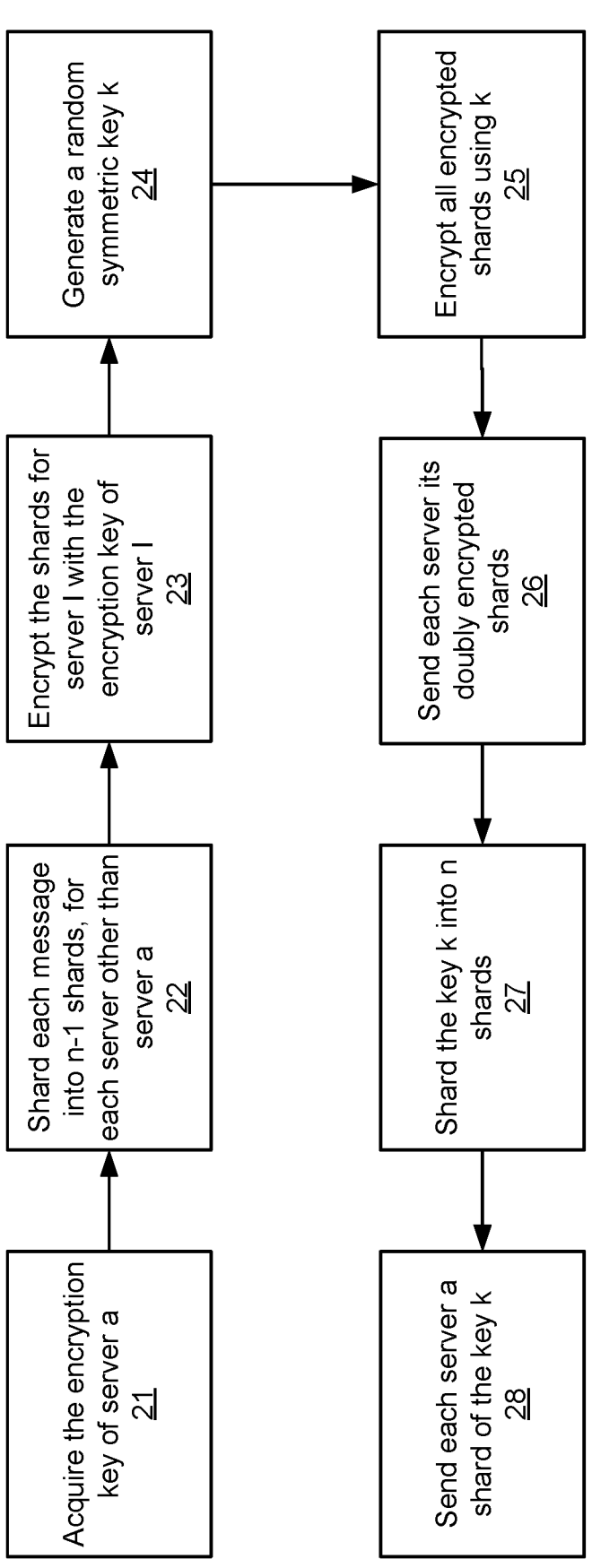
FIG. 2 is a diagram of logical flow illustrating how encryption of shards distributed to the servers in the course of enrollment is achieved by the first biometric computer system in accordance one embodiment of the present invention.

In some embodiments of the present invention, the shards distributed to the servers in the course of enrollment (as just described in connection with FIG. 4) are encrypted. FIG. 2 is a diagram of logical flow illustrating how such encryption is achieved by the first biometric computer system in accordance one embodiment of the present invention. In process 21, the first biometric computer acquires the encryption key of server a. In process 22, the first biometric computer system shards each message into n–1 shards, for each server other than server a. In process 23, the first biometric computer system encrypts the shards for each server i (other than server a) using the encryption key of server i (which the first biometric computer obtains from server i). There are now n–1 encrypted shards. Next, in process 24, the first biometric computer system generates a random symmetric key k. In process 25, the first biometric computer system further encrypts the n–1 encrypted shards using the symmetric key k. In process 26, the first biometric computer system sends each server i of the n–1 servers its corresponding doubly encrypted shard. (Remember that each shard for server i is initially encrypted with a key obtained from server i.) In process 27, the key k is itself sharded into n shards, and, in process 28, the first biometric computer system sends each server a shard of key k.

Figure 3:
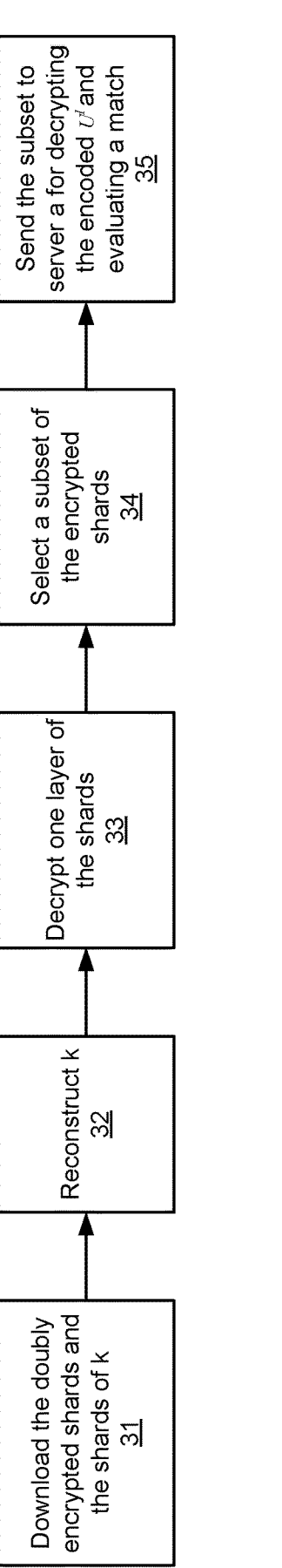
FIG. 3 is a diagram of logical flow in authentication under circumstances in which the shards have been encrypted in accordance with the processes described in connection with FIG. 2.

FIG. 3 is a diagram of logical flow in authentication under circumstances in which the shards have been encrypted in accordance with the processes just described in connection with FIG. 2. In process 31, the second biometric computer system downloads, from the servers, the doubly encrypted shards and the shards of k that were distributed by the first biometric computer system in processes 26 and 28 of FIG. 2. In process 32, the second biometric computer system reconstructs k. In process 33, the second biometric computer system uses the reconstructed k to decrypt one layer of the shards. However the shards at each server i (other than server a) remain encrypted by the encryption key of server i. In process 34, the second biometric computer system selects a subset of these encrypted shards and, in process 35, sends the subset to server a for decryption so as to recover from server a the encoding of biometric $U^I$ and cause evaluating by server a the existence of a match.

Figure 5:
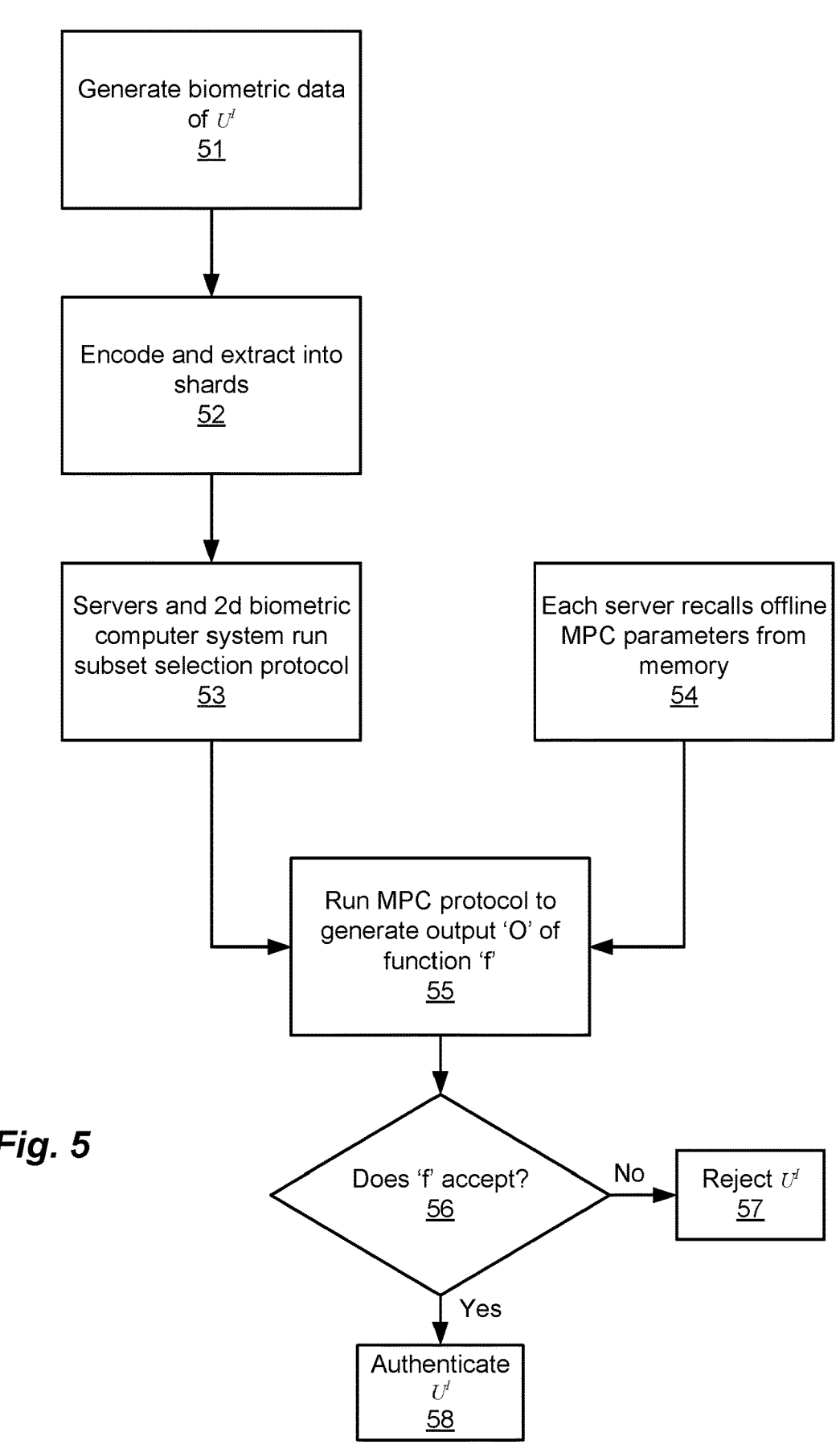
FIG. 5 is a diagram of logical flow of an authentication process, in accordance with a related embodiment of the present invention.

FIG. 5 is a diagram of logical flow of an authentication process, in accordance with a related embodiment of the present invention. During authentication, in process 51, a second biometric computer system generates biometric data of user $U^I$. Then, in process 52, the second biometric computer system encodes and extracts into shards the biometric data of user $U^I$. The biometric data thus encoded constitute the entropic points $P^I$ (first mentioned in section 1.1 above). In process 53 the servers and the second biometric computer system execute the select step of the subset protocol (described above in connection with FIG. 3) to select a subset of the encrypted shards that corresponds to $P^I$. At this point, each server then possesses shares of points of $P^I$, and shares of $E_T$. In process 54, each of the servers recalls, from memory, the MPC parameters that were precomputed from U in the offline phase (processes 44 and 45 in FIG. 4) of MPC. In process 55, the servers compute $f(E_T, P^I)$ jointly with the second biometric computer system without learning anything about $E_T$ and $P^I$. In one embodiment, function 'f' is a biometric match function. If the final output is 1, then $U^I$=U. Otherwise, $U^I$≠U. In process 56, each of the servers is programmed to accept or reject individually. An authentication in process 58 is successful if and only if all servers accept in process 56. Otherwise, authentication of the subject $U^I$ is rejected in process 57.

This authentication process has potential for usage in multiple areas. One skilled in the art will be able to recognize that this technology can be used for many applications, including authentication. Applicable industries include financial & banking, government & defense, healthcare & medical, retail, consumer authentication, enterprise, identity, and many others.

Moreover, although the above embodiment reveals a yes/no result for authentication, other embodiments include key derivation by e.g., sharding the key across the plurality of servers, and then (upon successful authentication), each server sends its shard to $U^I$. Therefore, upon successful authentication, $U^I$ can reconstruct a secret key to be used for further cryptographic operations.

Additional examples of authentication uses of some embodiments of the present invention include: Authenticating a user to a server (e.g., deriving SSH keys, client SSL certificates and keys, Enterprise 802.11 certificates and keys, OAUTH tokens, one-time-passwords, etc.).

Note that these can also be chained (e.g., OAUTH tokens can be used to obtain subsequent certificates/keys).

Additionally, some embodiments of the present invention may be used for authentication to the authentication servers themselves. For example, an authenticated user can update his/her authentication data, user details, authorization policies, etc. with each server.

4.0 Example Encoding Scheme and Authentication Algorithm

Now, we can put the above pieces together in an example embodiment that provides fingerprint authentication and achieves the security benefits described in Section 2. In this example embodiment, we will use fingerprint biometric data that will be encoded as described below and leverage the SPDZ multiparty computation protocol for the comparison phase. This example embodiment is discussed below.

4.1 Fingerprint Biometrics and Representations

Fingerprints are a common biometric modality that are widely deployed commercially today. Many fingerprint recognition algorithms use extracted minutiae (locations where fingerprint ridges split or end) locations and angles to represent a fingerprint. Comparison of two fingerprints then requires determining how close sets of minutiae are to each other. One method to do this matching is with the "Minutia Cylinder Code" (MCC). This method maps the space of minutia around a point into a three-dimensional quantized data structure (x-coordinate, y-coordinate, $\theta$-angle).

The presence of a minutia at a specific location with a specific angle assigns the associated point in the data structure to one. Absence corresponds to zero. To compare to fingerprints, one takes the dot product of the two minutia cylinder codes and determines if that dot product is greater than a threshold T:

$$E_T \cdot E_T I > T$$

where $E_T$ is the MCC encoding of template T, and $E_T I$ is the MCC encoding of template $T^I$.

If we choose an entropic subset $P' \subset T'$ (we sometimes refer to an "entropic subset" herein as a "confident subset") as the set of minutia with highest confidence and highest distinguishing power (cf. Section 2) then we can similarly encode $P^I$ as a MCC, and represent the matching function $f$ as the same dot product.

If we represent the MCC from $P^I$ entirely as 1's and 0's, then we can see that a dot product of $E_T$ with the encoding of $P^I$ simply as the sum of a subset of $E_T$. The subset operation is executed using the protocol in Section 3 and the sum/threshold operation is performed using MPC (described below).

Before continuing, note that the above MCC representation can be enhanced by using one or more of the following methods.

Using minutia features (e.g., minutia type, minutia neighborhoods, ridge descriptors) to more accurately describe the minutiae.

Using non-binary encodings to more smoothly handle noise by encoding a "score" for each minutia. Specifically locations close to the minutia are high score, and farther away are lower scores.

Using alignment free or globally aligned representations of the fingerprint, depending on the usage model and sensor parameters.

Using non-minutia features (e.g., ridge descriptors) instead of or in addition to minutia features.

Finally, note of course that other biometrics may also be used as inputs, and that multiple biometrics may be combined in a single enrollment or authentication.

We may represent the "norm" in the vector space in a number of forms including Hamming distance, Hamming distance of subsets, 1_p distance (for any p), 1_p distance of subsets, cosine similarity, etc. In one embodiment, we embed the notion of similarity between two vectors as a dot product between those two vectors.

4.2 SPDZ Multiparty Computation Overview

Recall the discussion of multiparty computation (MPC) from Section 2. The MPC component of our authentication protocol is responsible for performing the comparison algorithm. Specifically, as described above, one simple method of doing this is to compute a thresholded subset-sum. That is, given a set of values $x_i$ that are sharded across n servers, we want to compute:

$$\sum_i x_i > T$$

for some threshold T.

SPDZ is a protocol that performs computations on sharded data (as discussed in Section 2). It has all of the security requirements we require. Therefore, as discussed in Section 3, we can use the subset protocol to select the appropriate shards as input to the MPC protocol, and then the SPDZ protocol to compute the sum and threshold.

The threshold operation in our computation is an integer comparison, which is incredibly expensive in SPDZ (requiring a setup phase that takes several seconds of computation and communicates >50 MB of data per comparison). This cost would immediately render the protocol impractical.

However, we have identified a method to avoid the majority of this cost by leveraging the enrollment step. During enrollment, the original user U is by definition trusted by all of the servers. Therefore, U can generate all of the offline phase data on behalf of all of the servers, a process which (for technical reasons) removes the associated computation and communication complexity.

In embodiments using different MPC approaches (e.g., variants of SPDZ, etc.), these pre-generated data may vary. [See, e.g., Damgård, I., Keller, M., Larraia, E., Pastro, V., Scholl, P., and Smart, N. P. Practical covertly secure mpc for dishonest majority—or: breaking the SPDZ limits. In European Symposium on Research in Computer Security (2013), Springer, pp. 1-18.] They may further vary depending on the actual function being computed by the MPC protocol.

Therefore, we can run the SPDZ online protocol efficiently (with negligible computation cost and small quantities of data exchanged between servers).

5.0 Exemplary Embodiment Summary

In one embodiment, the final overall flow is the combination of the enrollment flow (depicted in FIG. 4) and the authentication flow (depicted in FIG. 6), discussed below.

An individual, who is user U, scans her biometric data and, via what we shall call a "first biometric computer," generates an encoding of the individual's biometric data. The encoding is used by the first biometric computer to generate shards of her biometric data as well as additional information that aids in the execution of the MPC protocol, but is not related to the U's biometric data. The shards and other data are distributed to the servers for use during the online authentication phase.

In the course of a later authentication process, a subject, who is user to be authenticated (and purporting to be the individual) scans her biometric data and, via what we shall call a "second biometric computer system," generates these biometric data and associated encoded template. Once this has occurred, $U^I$ generates shards of her biometric data and distributes them to the servers.

Finally, the servers independently run the online MPC protocol (e.g., SPDZ, FSS) using the offline data generated at enrollment to compute the biometric match function. At this point, each server has independently a shard of the output O, which are returned to $U^I$ who determines if the authentication was successful.

In another embodiment, the final overall flow is the combination of the enrollment flow (depicted in FIG. 4) and the authentication flow (depicted in FIG. 5).

An individual, who is user U, scans her biometric data and, via what we shall call a "first biometric computer," generates an encoding of the individual's biometric data. The encoding is used by the first biometric computer to generate encrypted shards of her biometric data as well as additional information that aids in the execution of the MPC protocol, but is not related to the U's biometric data. The encrypted shards and other data are distributed to the servers for use during the online authentication phase.

In the course of a later authentication process, a subject, who is user $U^I$, to be authenticated (and purporting to be the individual) scans her biometric data and, via what we shall call a "second biometric computer system," generates a confident subset of these biometric data and associated encoded template. Once this has occurred, $U^I$ and servers run the subset selection protocol, by which each server is provided a distinct set of decrypted shards of the encoded template, but is not provided with information by which such server could by itself determine the location of the decrypted shards.

Finally, the servers independently run the online MPC protocol (e.g., SPDZ) using the offline data generated at enrollment to compute the biometric match function. At this point, each server has independently determined the biometric match. $U^I$ is considered to be authenticated if all servers accept. Otherwise, $U^I$ is not authenticated.

Embodiments of the present invention are more efficient than previous multiparty computation approaches. For example, by (1) treating the enrolling user as a universally trusted individual among a set of mutually distrusting servers, and (2) using our secure subset selection algorithm, we are able to remove the expensive offline phase of interactive MPC protocols (such as computing multiplication triplets, etc.). By simplifying the authentication protocol to be a dot product, we reduce the number of rounds during the online phase to an acceptable number (for example, ~5 rounds, which can depend on precision).

In one embodiment, one or more servers enforce rate limiting or account lock-out if a condition is met. One skilled in the art would be familiar with such conditions. They may include, for example: too many incorrect authentications attempted, authentication attempts originating from certain locations, authentication attempts at certain times (e.g., time of day or date that indicates higher risk or uncharacteristic behavior for user), authentication attempts with varied identity assurance requirements, authentication attempts with factors that denote a certain risk level, etc. In one embodiment, after the condition is met, a security process is implemented. The security process may include, for example, preventing further authentication attempts for a period of time; notifying a user, server, or organization of suspicious behavior; and/or increasing the requirements for subsequent authentication, etc.

6.0 Additional Exemplary Embodiments

In another exemplary embodiment, the user may present multiple biometric modalities which are combined to form a single encoded template and/or confident subset.

In another embodiment, the user may present multiple biometric modalities, each of which is encoded and authenticated as described herein. Each generates a separate output value O. These output values are combined to determine whether the subject is authenticated as the individual.

In another embodiment, these output values combine to form a secret key.

In another embodiment, the same biometric shards may be enrolled at two (or more) separate thresholds by having U perform the offline phase for computing $f(E_T, P^I)$ at two (or more) thresholds and sending each of these sets along with her shards. During authentication, the desired threshold is selected, and the associated auxiliary data for computing $f(E_T, P^I)$ at the desired threshold are recalled and used in the authentication protocol. In one embodiment, authenticating at a lower threshold, which may have an easier user experience and lower False Reject Rate (FRR) but higher False Accept Rate (FAR), the subject is able to access lower risk functionality, such as viewing her account balance on a mobile banking app on her phone. In order for her to access certain functionality or authorize a higher risk transaction such as a high value transaction, she is required to authenticate at the higher threshold. In some embodiments, authenticating at the higher level requires additional factors, biometrics, or inputs.

In another embodiment, the shards and auxiliary data are encrypted at rest by one or more of the servers. This enables tiering the security.

In another exemplary embodiment, during the enrollment phase, an individual scans his/her fingerprints and enters his/her pin code on a device.

A first biometric computer system trusted by the individual determines the confident subset of the biometric input data. The first biometric computer system characterizes the confident subset into an ordered list or matrix of locations and unique biometric elements or e.g., minutiae. Every element is sharded by the first biometric computer system into n shards, where n is greater than 1. No shard characterizes even part of the biometric. In some embodiments, if an adversary obtained all but one of the n shards, the adversary still would not be able to recover any biometric information—all n shards would be needed. In another embodiment, a threshold number of shards is sufficient to recover biometric information.

In some embodiments, in order to obscure the location information, the first biometric computer system applies an ordering scheme. In some embodiments, the ordering scheme is based in part on the authentication inputs, such as the pin or fingerprints. In one embodiment, the sets of shards sent to servers each have the same ordering scheme applied. The first biometric computer system generates n sets of shards. The first biometric computer system also generates n unique and corresponding noise data sets to be used during the authentication phase.

In one embodiment, n is 2. The first set of shards is encrypted using key A. The second set of shards is encrypted using key B. The first biometric computer system sends to Server 1 a data collection that includes (a) the set of shards encrypted using key A, (b) key B, and (c) a noise data set. Similarly, the first biometric computer system sends to Server 2 a distinct data collection that includes (a) the set of shards encrypted using key B, (b) key A, and (c) a noise data set. It should be pointed out that Server 1 holds the key B that is used to encrypt the shards held by Server 2 and Server 2 holds the key A that is used to encrypt the shards held by Server 1, so that neither server is capable of decrypting the shards it holds using the key it holds. This is one example of the novel method of distributing shards and keys to different servers.

In one embodiment, the information sent by the processor is authenticated and/or signed. In the authentication phase, a subject purporting to be the individual scans his fingerprints and enters his pin code on a second device. A second biometric computer system coupled to the second device determines a confident subset of the biometric input data. In one embodiment, the second biometric computer system applies the ordering scheme to the confident subset. (In another embodiment, the second biometric computer system applies a reverse of the ordering scheme to the encrypted sets of shards instead.)

Server 1 sends the set of shards encrypted using key A to the second biometric computer system. Server 2 sends the set of shards encrypted using key B to the second biometric computer system. In one embodiment, the information sent by the server is authenticated. The information may be sent over a secure channel.

Using the confident subset, the second biometric computer system selects a new subset of each of the encrypted sets of shards.

In one embodiment, an ordering scheme (which may or may not be the same ordering scheme used previously) is applied to the new subsets. In another embodiment, locations are not included in the new subset. The second biometric computer system sends the new subset of shards that is encrypted using key A to Server 2. The second biometric computer system sends the new subset of shards that is encrypted using key B to Server 1.

In one embodiment, the information sent by the second biometric computer system is authenticated and/or signed. Server 1 uses key B to unencrypt the new subset of shards that is encrypted using key B. Server 2 uses key A to unencrypt the new subset of shards that is encrypted using key A. Now both servers have an unencrypted set of shards of the confident subset of biometrics from the subject purporting to be the individual. However, since location information is not included or not known, the compromise of even the unencrypted shards does not compromise the biometric information.

In one embodiment, Server 1 and Server 2 communicate with each other without sharing the unencrypted shards. The noise data sets are used to make this secure communication more efficient, including by increasing efficiency, requiring fewer computations, and by requiring less data to be exchanged between Server 1 and Server 2. This novel method enables secure communication among 2 or more servers in a very efficient way, leveraging auxiliary data (for example a noise data set) provided at the time of enrollment by a trusted party, which in some embodiments is the enrolling person or processor.

Once the computation is completed, Server 1 and Server 2 are able to determine (or have already determined) whether the subject is authenticated as the individual or not. In one embodiment, this determination is based on the combination of the shards revealing if the subject's confident subset was able to select sufficient unique biometric minutiae from the subject's data set, without the need for non-transient storage of the subject's data set. What is "sufficient" may depend on a threshold that can be adjusted, for example to reduce false reject rate (FRR) or false accept rate (FAR).

REFERENCES

1. Beaver, D. Efficient multiparty protocols using circuit randomization. In *Annual International Cryptology Conference* (1991), Springer, pp. 420-432.
2. Ignatenko, T., and Willems, F. M. Information leakage in fuzzy commitment schemes. *IEEE Transactions on Information Forensics and Security* 5, 2 (2010), 337-348.
4. Micali, S., and Rogaway, P. Secure computation. In *Annual International Cryptology Conference* (1991), Springer, pp. 392-404.
5. Shamir, A. How to share a secret. *Communications of the ACM* 22, 11 (1979), 612-613.
6. Stoianov, A., Kevenaar, T., and Van der Veen, M. Security issues of biometric encryption. In *Proceedings of Toronto International Conference on Science and Technology for Humanity* (2009), pp. 34-39.
7. Uludag, U., Pankanti, S., and Jain, A. K. Fuzzy vault for fingerprints. In *International Conference on Audio-and Video-Based Biometric Person Authenti-cation* (2005), Springer, pp. 310-319.
8. Yao, A. C.-C. Protocols for secure computations. In *FOCS* (1982), vol. 82, pp. 160-164.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method for using biometric data to authenticate a subject as an individual whose biometric data have been previously obtained using an enrollment computing facility that is coupled to a first transducer, the method utilizing computer processes comprising:

under a condition wherein (i) enrollment shards have been generated from the individual's biometric data by the enrollment computing facility and (ii) multiparty computation (MPC) information has been computed for later use, and (iii) with respect to both the enrollment shards and the MPC information, the enrollment computing facility has effectuated distribution thereof to a first plurality of servers in an array of servers:

obtaining a digital electronic signal characterizing a biometric of the subject from an authentication computing facility that is coupled to a second transducer, the authentication computing facility being distinct from the enrollment computing facility and the second transducer being distinct from the first transducer, causing encoding of the digital electronic signal as a set of vectors in a metric space, causing generation of authentication shards from the encoded digital electronic signal, using machine learning, and causing distribution of the authentication shards to a second plurality of servers in the array of servers;

wherein each enrollment shard taken alone, does not reveal the individual's biometric data; and wherein each authentication shard, taken alone, does not reveal the subject's biometric data;

causing performance of a data exchange process, which includes multiparty computation that involves communication among a subset of servers in the array and that also involves a subset of the enrollment shards, a subset of the authentication shards, and a subset of the MPC information, to develop information relating to authentication of the subject, wherein the MPC information has been configured to facilitate the multiparty computation and the data exchange process includes computing a set of distances in the metric space and comparing the computed distances against a threshold; and following development of the authentication information, causing processing of the authentication information to generate an output value corresponding to a determination whether the subject is authenticated as the individual.

2. A method according to claim 1, wherein the computer processes are performed by computing entities configured as information-sharing restricted with respect to a set of items of information selected from a group consisting of the output value, the digital electronic signal, the individual's biometric data, the subject's biometric, the authentication shards, and combinations thereof.

3. A method according to claim 1, the computer processes further comprising encoding the digital electronic signal, so that the authentication shards are also encoded.

4. A method according to claim 3, wherein encoding includes using a neural net.

5. A method according claim 1, wherein the data exchange process is performed under conditions wherein none of the servers in the server array obtains intermediate values of the multiparty computation.

6. A method according to claim 1, wherein a selected group of the array of servers causes generation of new shards based on the authentication shards.

7. A method according to claim 1, wherein a shard is revocable by a revocation process that includes the data exchange process.

8. A method according to claim 7, wherein, upon revocation of the shard, generation of a new shard does not require the individual re-engage with the first transducer.

9. A method according to claim 7, wherein the revocation process is configured in a manner without communication between the array of servers and other computing entities.

10. A method according to claim 7, wherein the revocation process includes performing the data exchange process using a subset of the subset of the authentication shards from a subset of the array of servers.

11. A method according to claim 10, wherein the data exchange process involves communication among a selected group of servers from the array of servers.

12. A method according to claim 10, wherein each server in the subset of the array of servers has received and stored a set of registration shards derived from the individual's biometric data and performing the data exchange process includes separately processing, by each server, its set of registration shards of the individual along with its authentication shards of the subject to generate a new set of shards, the new set of shards constituting the output value.

13. A method according to claim 1, wherein causing the distribution of the authentication shards includes receiving and storing message authentication codes for the shards and the data exchange process includes using the message authentication codes to confirm that the output value indicating whether the subject is authenticated as the individual is itself authentic.

14. A method according to claim 1, wherein causing the distribution of the authentication shards includes receiving and storing shards of Beaver triples distributed across the array of servers with the authentication shards.

15. A method according to claim 14, wherein causing the distribution of the authentication shards includes receiving and storing message authentication codes for the Beaver triples.

16. A method according to claim 15, wherein causing the distribution of the authentication shards includes receiving and storing shards of a corresponding message authentication code key.

17. A method according to claim 1, wherein causing the distribution of the authentication shards includes receiving and storing shards of a random value.

18. A method according to claim 1, wherein causing the distribution of the authentication shards includes receiving and storing shards of a function that contributes to an authentication process.

19. A method according to claim 1, wherein causing the distribution of the authentication shards includes extracting a confident subset of a set of biometric values of the subject in the digital electronic signal.

20. A method according to claim 1, wherein causing the distribution of the authentication shards includes a set of values to enable efficient subsequent generation of shards includes receiving and storing items selected from the group consisting of Beaver triples, authentication shares, message authentication code shards, random shards, other shards, and combinations thereof.

21. A method according to claim 15, wherein the data exchange process includes causing the array of servers to execute the multiparty computation to determine a blinded value, causing the array of servers to compute a corresponding shard, and to return, to a computing entity, the computed shard along with values for the message authentication codes previously computed, causing the computing entity to use the shard data to determine whether the subject is authenticated as the individual and to evaluate the message authentication codes.

22. A method according to claim 1, wherein the first plurality of servers in the array is the same as the second plurality of servers.

23. A method for using biometric data to authenticate a subject as an individual whose biometric data have been previously obtained using an enrollment computing facility that is coupled to a first transducer, the method utilizing computer processes comprising:

under a condition wherein enrollment shards have been generated from the individual's biometric data and distributed to a first plurality of servers in an array of servers:

obtaining a digital electronic signal characterizing a biometric of the subject from an authentication computing facility that is coupled to a second transducer, the authentication computing facility being distinct from the enrollment computing facility and the second transducer being distinct from the first transducer, causing encoding of the digital electronic signal as a set of vectors in a metric space, causing generation of authentication shards from the encoded digital electronic signal, using machine learning, and causing distribution of the authentication shards to a second plurality of servers in the array of servers;

wherein each enrollment shard taken alone, does not reveal the individual's biometric data; and wherein each authentication shard, taken alone, does not reveal the subject's biometric data;

causing performance of a data exchange process, which includes multiparty computation that involves communication among a subset of servers in the array and that also involves a subset of the enrollment shards and a subset of the authentication shards, to develop information relating to authentication of the subject and the data exchange process includes computing a set of distances in the metric space and comparing the computed distances against a threshold; and following development of the authentication information, causing processing of the authentication information to generate an output value corresponding to a determination whether the subject is authenticated as the individual.

24. A method according to claim 23, wherein the computer processes are performed by computing entities configured as information-sharing restricted with respect to a set of items of information selected from a group consisting of the output value, the digital electronic signal, the individual's biometric data, the subject's biometric, the authentication shards, and combinations thereof.

25. A method according to claim 23, the computer processes further comprising encoding the digital electronic signal, so that the authentication shards are also encoded.

26. A method according to claim 25, wherein encoding includes using a neural net.

27. A method according to claim 23, wherein the data exchange process is performed under conditions wherein none of the servers in the server array obtains intermediate values of the multiparty computation.

28. A method according to claim 23, wherein a selected group of the array of servers causes generation of new shards based on the authentication shards.

29. A method according to claim 23, wherein, a shard is revocable by a revocation process that includes the data exchange process.

30. A method according to claim 29, wherein, upon revocation of the shard, generation of a new shard does not require the individual re-engage with the first transducer.

31. A method according to claim 29, wherein the revocation process is configured in a manner without communication between the array of servers and other computing entities.

32. A method according to claim 29, wherein the revocation process includes performing the data exchange process using a subset of the subset of the authentication shards from a subset of the array of servers.

33. A method according to claim 32, wherein the data exchange process involves communication among a selected group of servers from the array of servers.

34. A method according to claim 32, wherein each server in the subset of the array of servers has received and stored a set of registration shards derived from the individual's biometric data and performing the data exchange process includes separately processing, by each server, its set of registration shards of the individual along with its authentication shards of the subject to generate a new set of shards, the new set of shards constituting the output value.

35. A method according to claim 23, wherein causing the distribution of the authentication shards includes receiving and storing message authentication codes for the shards and the data exchange process includes using the message authentication codes to confirm that the output value indicating whether the subject is authenticated as the individual is itself authentic.

36. A method according to claim 23, wherein causing the distribution of the authentication shards includes receiving and storing shards of Beaver triples distributed across the array of servers with the authentication shards.

37. A method according to claim 36, wherein causing the distribution of the authentication shards includes receiving and storing message authentication codes for the Beaver triples.

38. A method according to claim 37, wherein causing the distribution of the authentication shards includes receiving and storing shards of a corresponding message authentication code key.

39. A method according to claim 23, wherein causing the distribution of the authentication shards includes receiving and storing shards of a random value.

40. A method according to claim 23, wherein causing the distribution of the authentication shards includes receiving and storing shards of a function that contributes to an authentication process.

41. A method according to claim 23, wherein causing the distribution of the authentication shards includes extracting a confident subset of a set of biometric values of the subject in the digital electronic signal.

42. A method according to claim 23, wherein causing the distribution of the authentication shards includes a set of values to enable efficient subsequent generation of shards includes receiving and storing items selected from the group consisting of Beaver triples, authentication shares, message authentication code shards, random shards, other shards, and combinations thereof.

43. A method according to claim 37, wherein the data exchange process includes causing the array of servers to execute the multiparty computation to determine a blinded value, causing the array of servers to compute a corresponding shard, and to return, to a computing entity, the computed shard along with values for the message authentication codes previously computed, causing the computing entity to use the shard data to determine whether the subject is authenticated as the individual and to evaluate the message authentication codes.

44. A method according to claim 23, wherein the first plurality of servers in the array is the same as the second plurality of servers.

45. A method for using biometric data to authenticate a subject as an individual whose biometric data have been previously obtained using an enrollment computing facility that is coupled to a first transducer, the method utilizing computer processes comprising:

under a condition wherein (i) enrollment shards have been generated from the individual's biometric data by the enrollment computing facility and (ii) the enrollment computing facility has effectuated distribution of the enrollment shards to a first plurality of servers in an array of servers:

obtaining a digital electronic signal characterizing a biometric of the subject from an authentication computing facility that is coupled to a second transducer, the authentication computing facility being distinct from the enrollment computing facility and the second transducer being distinct from the first transducer, causing encoding of the digital electronic signal as a set of vectors in a metric space, causing generation of authentication shards from the encoded digital electronic signal, using machine learning, and causing distribution of the authentication shards to a second plurality of servers in the array of servers;

wherein each enrollment shard taken alone, does not reveal the individual's biometric data; and wherein each authentication shard, taken alone, does not reveal the subject's biometric data;

causing performance of a data exchange process, which includes multiparty computation that involves communication among a subset of servers in the array and that also involves a subset of the enrollment shards and a subset of the authentication shards to develop information relating to authentication of the subject and the data exchange process includes computing a set of distances in the metric space and comparing the computed distances against a threshold; and following development of the authentication information, causing processing of the authentication information to generate an output value corresponding to a determination whether the subject is authenticated as the individual.

46. A method according to claim 45, wherein the computer processes are performed by computing entities configured as information-sharing restricted with respect to a set of items of information selected from a group consisting of the output value, the digital electronic signal, the individual's biometric data, the subject's biometric, the authentication shards, and combinations thereof.

47. A method according to claim 45, the computer processes further comprising encoding the digital electronic signal, so that the authentication shards are also encoded.

48. A method according to claim 47, wherein encoding includes using a neural net.

49. A method according claim 45, wherein the data exchange process is performed under conditions wherein none of the servers in the server array obtains intermediate values of the multiparty computation.

50. A method according to claim 45, wherein a selected group of the array of servers causes generation of new shards based on the authentication shards.

51. A method according to claim 45, wherein, a shard is revocable by a revocation process that includes the data exchange process.

52. A method according to claim 51, wherein, upon revocation of the shard, generation of a new shard does not require the individual re-engage with the first transducer.

53. A method according to claim 51, wherein the revocation process is configured in a manner without communication between the array of servers and other computing entities.

54. A method according to claim 51, wherein the revocation process includes performing the data exchange process using a subset of the subset of the authentication shards from a subset of the array of servers.

55. A method according to claim 54, wherein the data exchange process involves communication among a selected group of servers from the array of servers.

56. A method according to claim 54, wherein performing the data exchange process includes separately processing, by each server, its generated shards of the individual along with its authentication shards of the subject to generate a new set of shards, the new set of shards constituting the output value.

57. A method according to claim 45, wherein each server in the subset of the array of servers has received and stored a set of registration shards derived from the individual's biometric data and performing the data exchange process includes separately processing, by each server, its set of registration shards of the individual along with its authentication shards of the subject to generate a new set of shards, the new set of shards constituting the output value.

58. A method according to claim 45, wherein causing the distribution of the authentication shards includes receiving and storing shards of Beaver triples distributed across the array of servers with the authentication shards.

59. A method according to claim 58, wherein causing the distribution of the authentication shards includes receiving and storing message authentication codes for the Beaver triples.

60. A method according to claim 59, wherein causing the distribution of the authentication shards includes receiving and storing shards of a corresponding message authentication code key.

61. A method according to claim 45, wherein causing the distribution of the authentication shards includes receiving and storing shards of a random value.

62. A method according to claim 45, wherein causing the distribution of the authentication shards includes receiving and storing shards of a function that contributes to an authentication process.

63. A method according to claim 45, wherein causing the distribution of the authentication shards includes extracting a confident subset of a set of biometric values of the subject in the digital electronic signal.

64. A method according to claim 45, wherein causing the distribution of the authentication shards includes a set of values to enable efficient subsequent generation of shards includes receiving and storing items selected from the group consisting of Beaver triples, authentication shares, message authentication code shards, random shards, other shards, and combinations thereof.

65. A method according to claim 59, wherein the data exchange process includes causing the array of servers to execute the multiparty computation to determine a blinded value, causing the array of servers to compute a corresponding shard, and to return, to a computing entity, the computed shard along with values for the message authentication codes previously computed, causing the computing entity to use the shard data to determine whether the subject is authenticated as the individual and to evaluate the message authentication codes.

66. A method according to claim 45, wherein the first plurality of servers in the array is the same as the second plurality of servers.

\* \* \* \* \*